(12) United States Patent
Cowart

(10) Patent No.: US 11,852,466 B2
(45) Date of Patent: Dec. 26, 2023

(54) GAP MEASUREMENT TOOL ASSEMBLY, SYSTEM, AND METHOD FOR MEASURING A GAP BETWEEN MATING PARTS OF A STRUCTURE

(71) Applicant: The Boeing Company, Chicago, IL (US)

(72) Inventor: George Stephen Cowart, Mount Pleasant, SC (US)

(73) Assignee: The Boeing Company, Arlington, VA (US)

( * ) Notice: Subject to any disclaimer, the term of this patent is extended or adjusted under 35 U.S.C. 154(b) by 280 days.

(21) Appl. No.: 17/520,546

(22) Filed: Nov. 5, 2021

(65) Prior Publication Data

US 2023/0147072 A1 May 11, 2023

(51) Int. Cl.
*G01B 13/12* (2006.01)
(52) U.S. Cl.
CPC .................... *G01B 13/12* (2013.01)
(58) Field of Classification Search
CPC ..................................................... G01B 13/12
See application file for complete search history.

(56) References Cited

U.S. PATENT DOCUMENTS

| 2,636,379 | A | * | 4/1953 | Van Dorn | G01B 13/12 33/517 |
| 6,119,348 | A | * | 9/2000 | Jennings | F16C 17/026 310/90 |
| 2011/0099827 | A1 | * | 5/2011 | Egger | G01B 13/12 33/701 |
| 2014/0083203 | A1 | * | 3/2014 | Okamoto | G01B 13/12 73/861.61 |

* cited by examiner

*Primary Examiner* — Paul M. West

(57) ABSTRACT

A gap measurement tool assembly for measuring a gap at a through hole between mating parts of a structure is provided. The assembly includes a gap measurement tool with a first end, a second end, and a body having a hollow inner channel, an exterior annular crevice, a first exterior annular groove having a cross-hole intersected by the hollow inner channel, and a second exterior annular groove. The assembly includes a first seal element, a second seal element, and a third seal element. The assembly is configured for insertion and sealing into the through hole, and the cross-hole is configured to align with the gap. When compressed air is passed into the gap, an air gage system takes a measurement of one of, a back pressure, an air flow, or a differential pressure, and correlates the measurement to a predetermined gap measurement, to determine a gap size of the gap.

20 Claims, 15 Drawing Sheets

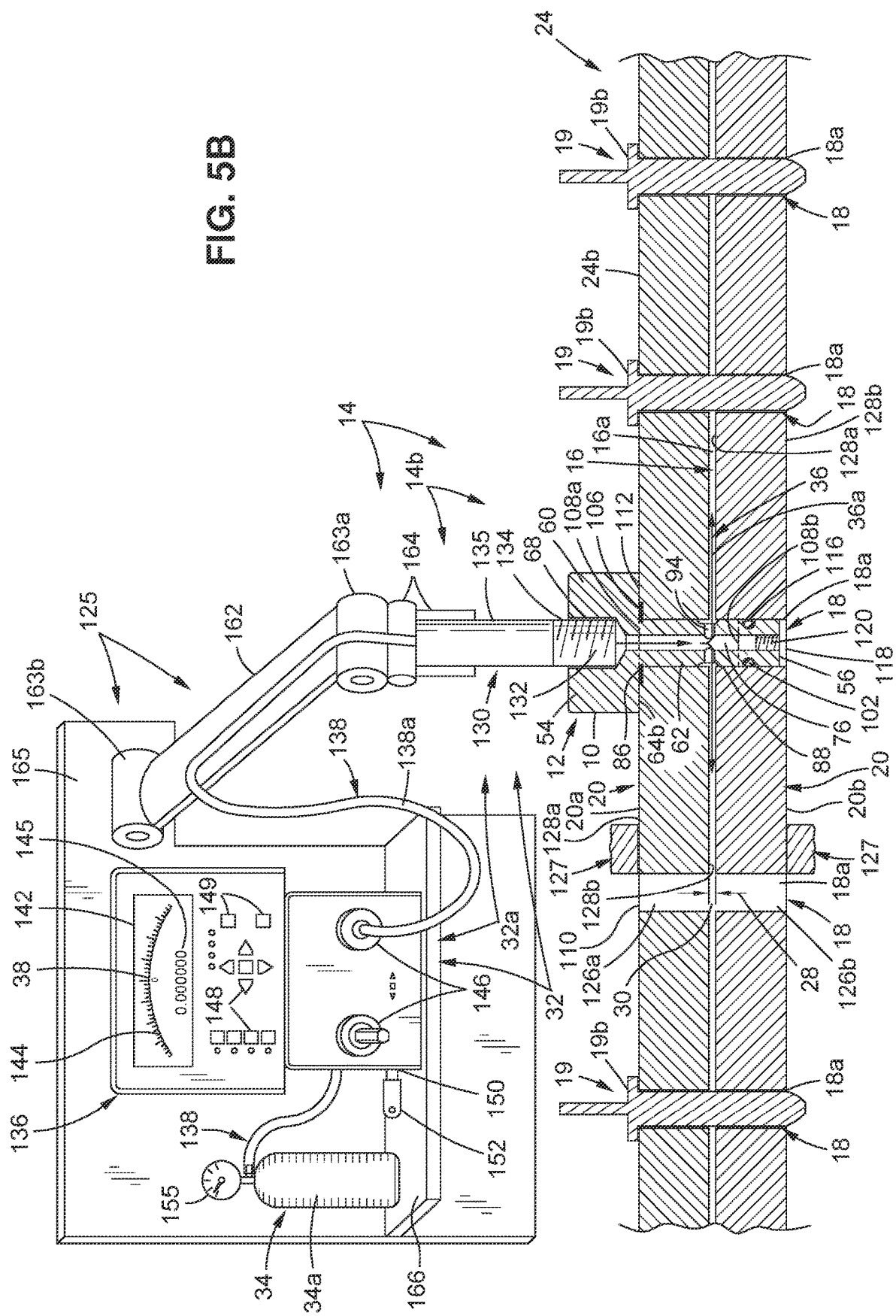

GAP MEASUREMENT TOOL ASSEMBLY, SYSTEM, AND METHOD FOR MEASURING A GAP BETWEEN MATING PARTS OF A STRUCTURE

FIELD

The disclosure relates generally to assemblies, systems, and methods for measuring gaps between mating parts, and more specifically, to assemblies, systems, and methods for measuring part interface gaps between mating aircraft parts using an air gage system.

BACKGROUND

In the manufacture of large structures, such as aircraft, rotorcraft, spacecraft, watercraft, and other large structures, the proper joining of parts is important to minimize any residual stresses incorporated into such large structures during the assembly process. Such residual stresses may be created when parts that do not fit together properly at all interface points are tightly fastened together, which may result in bending of the parts and introduction of such residual stresses into the assembly. To prevent such bending of the parts and introduction of residual stresses, manufacture and assembly requirements typically specify a maximum part interface gap between mating parts that is allowed with a minimum force to hold the parts together. For example, for mating or assembled aircraft parts, such as for an aircraft fuselage section, a maximum gap, such as a part interface gap, may be 0.005 inch with an assembly force of 5 pounds per foot applied.

Known apparatuses, systems, and methods exist for measuring gaps, such as part interface gaps. For example, one such known apparatus, system, and method includes use of a flat feeler gage manually inserted by an operator at gaps, such as part interface gaps, at edges of the mating or assembled parts to ensure that the feeler gage having a specified thickness, such as 0.005 inch, does not fit into the gap. This may require multiple gap checks by repeatedly trying different sizes of feeler gages. For large parts, such as having a length of greater than 10 feet, this may be a tedious and time consuming process.

Moreover, the assembly geometry of the mating or assembled parts may be such that the edges of the parts are covered or not accessible to be edge-checked. In this case, temporary fasteners may be used to fasten the parts together at predetermined clamp loads and intermediate unfilled holes may be used to measure for the existence of gaps, such as part interface gaps. The flat feeler gage used for such measuring is typically modified to have a 90 degree bend to probe inside the intermediate unfilled holes, so that the gap check process may be made through such intermediate unfilled holes, which may be very small in size.

To obtain a gap measurement using a modified feeler gage with a 90 degree bend, for example, a modified feeler gage having a thickness of 0.005 inch, the modified feeler gage is inserted into the gap, and a gap width is determined. This may require multiple gap checks by repeatedly trying different sizes of feeler gages, such as successively larger and larger feeler gages, until either a gap measurement is obtained, that is, until the largest size that fits within the gap is determined and designated as a "gap width", or it is determined that the feeler gage, such as the 0.005 inch feeler gage, does not fit and the gap is less than the maximum allowance. Such gap measuring may have to be manually performed on thousands of individual intermediate unfilled holes on a single aircraft assembly.

Obtaining such gap measurements through intermediate unfilled holes is a two-step process and may be difficult to perform and may require manual dexterity and operator "feel" to determine the existence of a gap with any reasonable certainty and may produce a wide variation in results. Moreover, obtaining such gap measurements through intermediate unfilled holes may be time consuming, labor intensive, and ergonomically challenging for operators repeatedly taking such gap measurements.

Accordingly, there is a need in the art for an improved assembly, system, and method for measuring gaps, such as part interface gaps, between mating parts, that are fast, that may be automated, that are simple and stable, that provide accurate, robust, and repeatable measurements, and that provide advantages over known assemblies, systems, and methods.

SUMMARY

Example implementations of the present disclosure provide an assembly, system, and method for measuring part interface gaps between mating parts. As discussed in the below detailed description, versions of the assembly, system, and method may provide significant advantages over known assemblies, systems, and methods.

In a version of the disclosure, there is provided a gap measurement tool assembly for measuring a gap at a through hole between mating parts of a structure. The gap measurement tool assembly comprises a gap measurement tool.

The gap measurement tool comprises a first end configured to couple to an air gage system and an air supply source and a second end configured to be inserted into the through hole. The gap measurement tool further comprises a body formed between the first end and the second end. The body comprises a hollow inner channel, an exterior annular crevice, a first exterior annular groove having a cross-hole intersected by the hollow inner channel, and a second exterior annular groove positioned distal to the first exterior annular groove.

The gap measurement tool assembly further comprises a first seal element fitted around the exterior annular crevice. The gap measurement tool assembly further comprises a second seal element fitted around the second exterior annular groove. The gap measurement tool assembly further comprises a third seal element inserted into a portion of the hollow inner channel at the second end of the gap measurement tool.

The gap measurement tool assembly is configured for insertion and sealing into the through hole and through the mating parts, and the cross-hole is configured to align with the gap, such that when compressed air is passed into the gap, via the hollow inner channel, the air gage system takes a measurement of one of, a back pressure, an air flow, or a differential pressure, and correlates the measurement to a predetermined gap measurement, to determine a gap size of the gap at the through hole between the mating parts of the structure.

In another version of the disclosure, there is provided a gap measurement system for measuring a gap at a through hole between mating parts of a structure. The gap measurement system comprises a gap measurement tool assembly configured for insertion into the through hole and for alignment with the gap between the mating parts.

The gap measurement tool assembly comprises a gap measurement tool. The gap measurement tool comprises a first end, a second end, and a body formed between the first end and the second end. The body comprises a hollow inner channel, an exterior annular crevice, a first exterior annular groove having a cross-hole intersected by the hollow inner channel, and a second exterior annular groove positioned distal to the first exterior annular groove.

The gap measurement tool assembly further comprises a first seal element fitted around the exterior annular crevice. The gap measurement tool assembly further comprises a second seal element fitted around the second exterior annular groove. The gap measurement tool assembly further comprises a third seal element inserted into a portion of the hollow inner channel at the second end of the gap measurement tool.

The gap measurement system further comprises an air gage system coupled to the first end of the gap measurement tool. The gap measurement system further comprises an air supply source having compressed air. The air supply source is coupled to the air gage system.

When the gap measurement tool assembly is inserted into the through hole and through the mating parts, so that the cross-hole is aligned with the gap, and an entry side and an exit side of the through hole are sealed, the compressed air is passed into the gap, via the hollow inner channel, and the air gage system takes a measurement of one of, a back pressure, an air flow, or a differential pressure, and correlates the measurement to a predetermined gap measurement, to determine a gap size of the gap at the through hole between the mating parts of the structure.

In another version of the disclosure, there is provided a method for measuring a gap at a through hole between mating parts of a structure. The method comprises the step of providing a gap measurement tool assembly. The gap measurement tool assembly comprises a gap measurement tool comprising a first end, a second end, and a body formed between the first end and the second end. The body comprises a hollow inner channel, an exterior annular crevice, a first exterior annular groove having a cross-hole intersected by the hollow inner channel, and a second exterior annular groove positioned distal to the first exterior annular groove.

The gap measurement tool assembly further comprises a first seal element fitted around the exterior annular crevice. The gap measurement tool assembly further comprises a second seal element fitted around the second exterior annular groove. The gap measurement tool assembly further comprises a third seal element inserted into a portion of the hollow inner channel at the second end of the gap measurement tool.

The method further comprises the step of coupling the gap measurement tool assembly to an air gage system and an air supply source having compressed air, to obtain a gap measurement system. The method further comprises the step of inserting the gap measurement tool assembly into the through hole and through the mating parts, so that the cross-hole of the gap measurement tool is aligned with the gap at the through hole between the mating parts, and an entry side and an exit side of the through hole are sealed.

The method further comprises the step of passing the compressed air through the hollow inner channel of the gap measurement tool and into the gap. The method further comprises the step of using the air gage system to take a measurement of one of, a back pressure, an air flow, or a differential pressure. The method further comprises the step of correlating the measurement to a predetermined gap measurement, to determine a gap size of the gap at the through hole between the mating parts of the structure.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 5B is an illustration of an exemplary version of an automated gap measurement system of the disclosure, coupled to a robot;

Figure 1A:
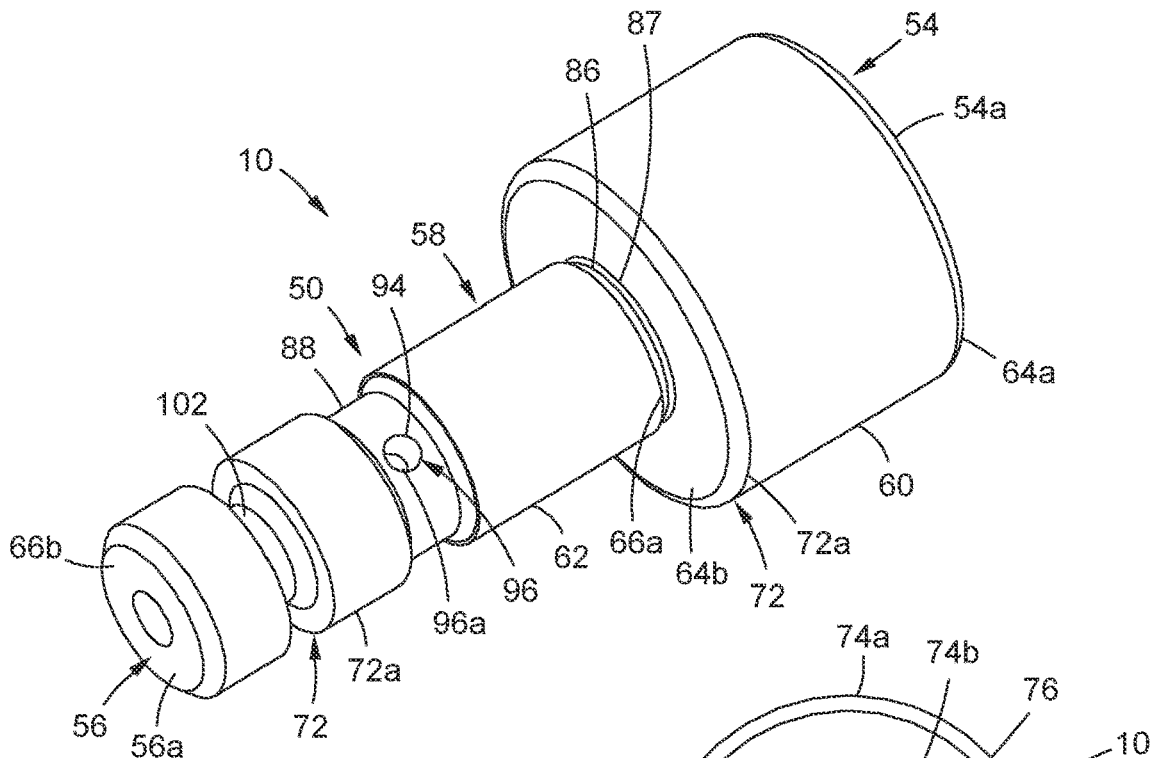
FIG. 1A is an illustration of a perspective side view of an exemplary version of a gap measurement tool of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

There is disclosed herein a gap measurement tool 10 (see FIGS. 1A-1E), which is part of a gap measurement tool assembly 12 (see FIGS. 2A-2B), a gap measurement system 14 (see FIG. 4), which includes the gap measurement tool assembly 12, and a method 180 (see FIG. 8), discussed in further detail below. The gap measurement tool assembly 12, the gap measurement system 14, and the method 180 are designed to measure a gap 16 (see FIGS. 4, 5A-5B), such as a part interface gap 16a (see FIGS. 4, 5A-5B), at a through hole 18 (see FIGS. 4, 5A-5B), such as a fastener through hole 18a (see FIGS. 4, 5A-5B) between mating parts 20 (see FIGS. 4, 5A-5B), such as aircraft mating parts 22 (see FIGS. 4, 5A, 9), of a structure 24 (see FIGS. 4, 5A-5B), such as an aircraft structure 26 (see FIGS. 4, 5A, 9), for example, cylindrical or curved objects such as fuselage sections 26a (see FIGS. 4, 5A), or an aircraft structure 26 such as a tail section 26b (see FIG. 4), or another suitable aircraft structure. The mating parts 20 comprise a stack-up of mating parts 20 that are adjoined. The structure 24 may comprise a fully assembled structure 24a (see FIG. 5A), or a partially assembled structure 24b (see FIG. 5B).

The gap measurement tool assembly 12, the gap measurement system 14, and the method 180, are used to conduct gap analysis and to determine a gap size 28 (see FIGS. 4, 5A-5B), such as a gap width 30 (see FIGS. 4, 5A-5B), of any gaps 16 that occur when joining together mating parts 20, such as aircraft mating parts 22, of the structure 24, such as the aircraft structure 26, for example, the fuselage section 26a, the tail section 26b, or another suitable aircraft structure, using through holes 18 configured to receive fasteners 19 (see FIGS. 5A-5B), such as permanent fasteners 19a (see FIG. 5A), or temporary fasteners 19b (see FIG. 5B), for example, rivets, bolts, screws, or other suitable fasteners.

Figure 4:
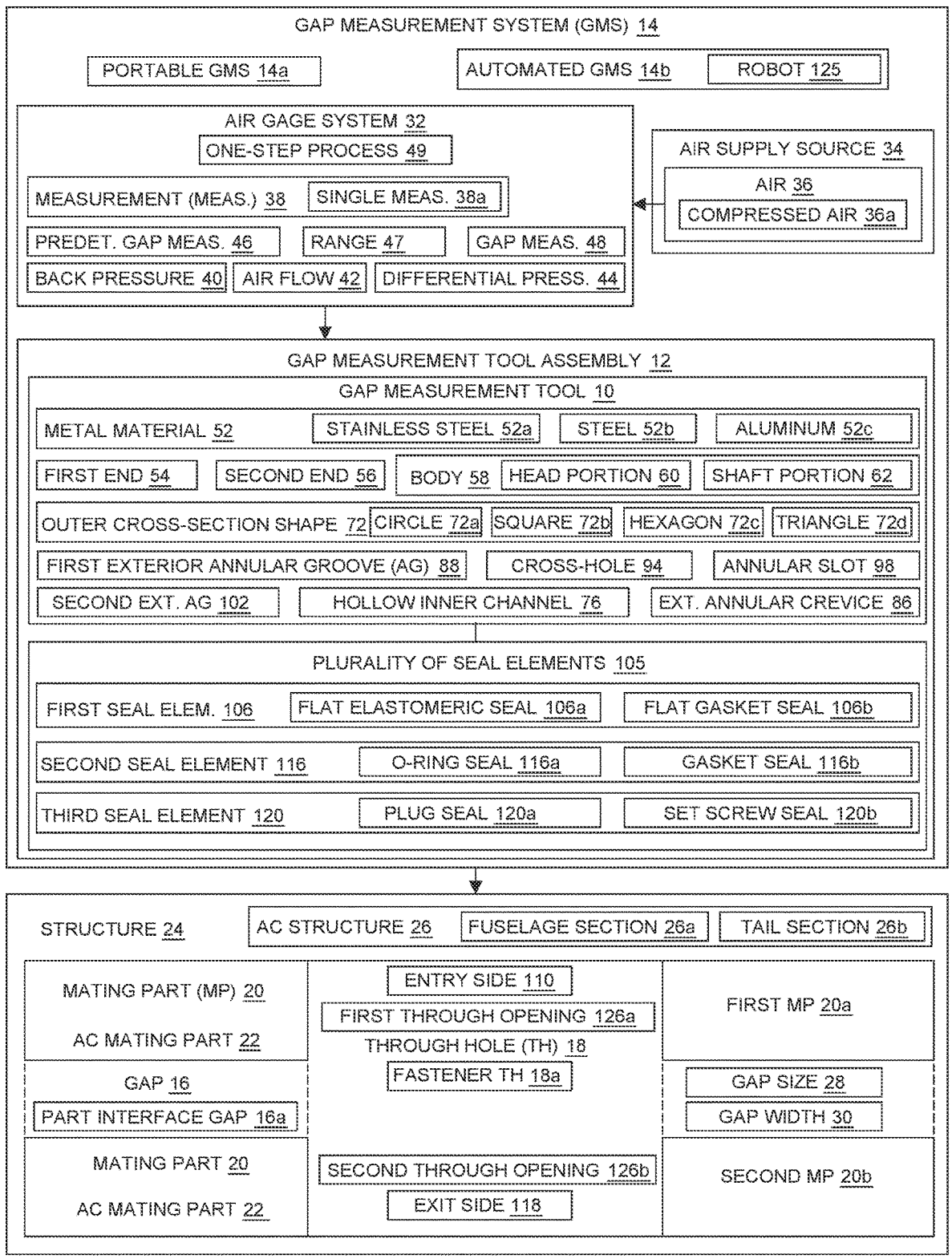
FIG. 4 is an illustration of a block diagram of an exemplary gap measurement system with a gap measurement tool assembly for measuring a gap at a through hole between mating parts, in accordance with an illustrative version of the disclosure.
Figure 5A:
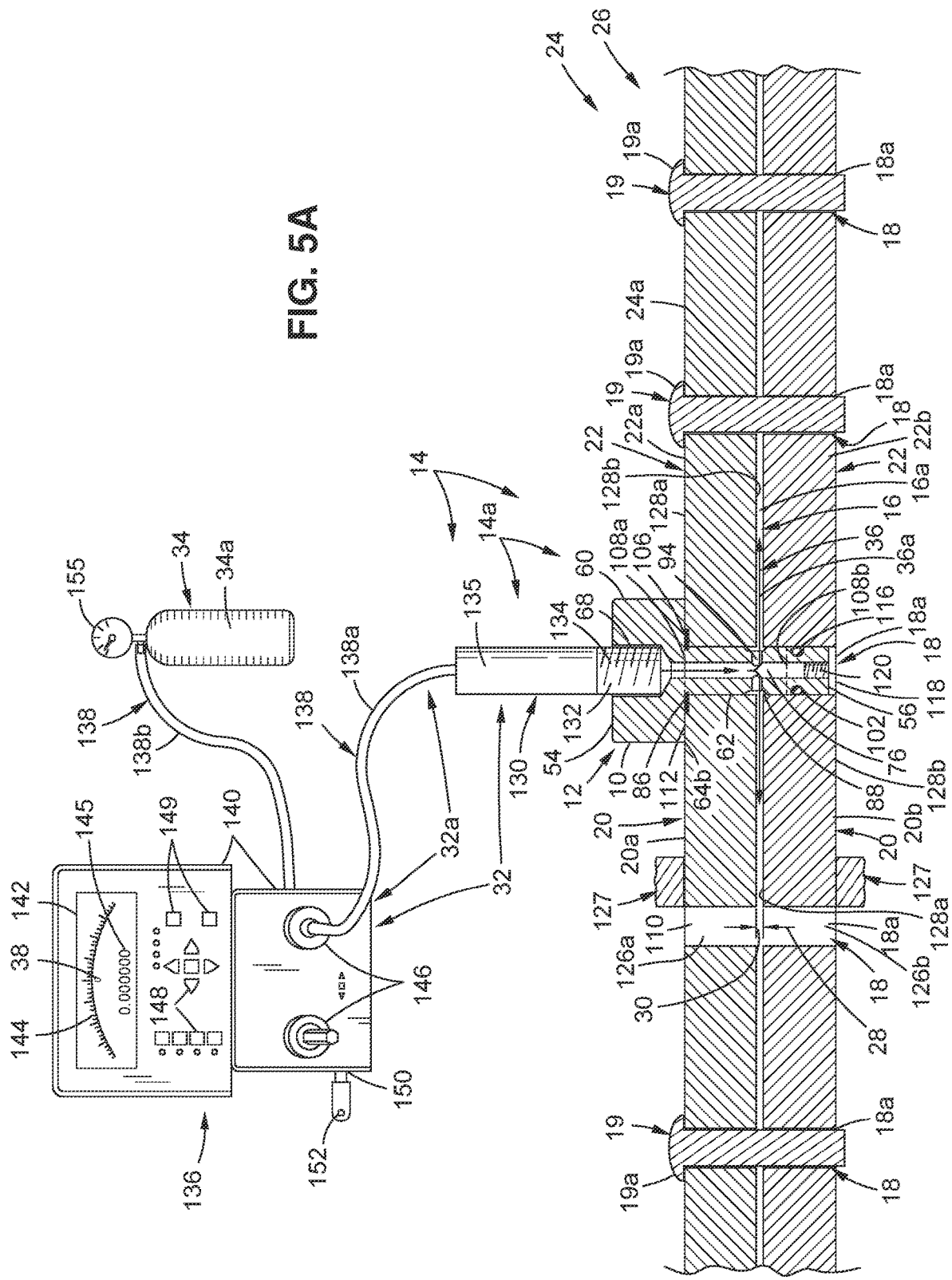
FIG. 5A is an illustration of an exemplary version of a portable gap measurement system of the disclosure.

The gap measurement system 14 and the method 180 use an air gage system 32 (see FIGS. 4, 5A-5B) and an air supply source 34 (see FIGS. 4, 5A-5B), with air 36 (see FIG. 4), such as compressed air 36a (see FIGS. 4, 5A-5B). The air gage system 32 is coupled, or attached, to the gap measurement tool assembly 12, and the gap measurement tool assembly 12 is inserted, partially or completely, through the through hole 18 and through the mating parts 20, and properly sealed, as discussed below. The air 36, such as compressed air 36a, from the air supply source 34, is passed through the gap measurement tool 10 and into the gap 16.

The air gage system 32 is used to take a measurement 38 (see FIG. 4) of one of, a back pressure 40 (see FIG. 4), an air flow 42 (see FIG. 4), or a differential pressure 44 (see FIG. 4), and correlates the measurement 38 to a predetermined gap measurement 46 (see FIG. 4), to determine the gap size 28 of the gap 16, or gap measurement 48 (see FIG. 4), at the through hole 18 between the mating parts 20 of the structure 24. The air flow 42, such as the flow of the air 36, for example, the compressed air 36a, is proportional to the gap size 28 of the gap 16. Further, leakage of air 36, such as compressed air 36a, through the gap measurement tool 10 and through the gap 16 between the mating parts 20 causes a corresponding change in the back pressure 40 or the differential pressure 44 and is proportional to, or correlated to, the gap size 28 of the gap 16.

The gap measurement system 14 and the method 180 use only a single measurement 38a (see FIG. 4) in a one-step process 49 (see FIG. 4), to measure and determine the gap size 28 of the gap 16, or gap measurement 48. The use of the gap measurement tool assembly 12, the gap measurement system 14, and the method 180 avoid use of known feeler gauges and a two-step process using such known feeler gauges, and avoid multiple gap checks by repeatedly trying different sizes of feeler gages. The use of the gap measurement tool assembly 12, the gap measurement system 14, and the method 180 are simple to use and provide accurate, robust, and repeatable measurements. Further, the gap measurement tool assembly 12, the gap measurement system 14, and the method 180 provide the ability to take gap measurements 48 (see FIG. 4) of gaps 16 between mating parts 20, or adjoining parts, where it may not be possible to take a gap measurement 48 because of geometry.

Figure 1C:
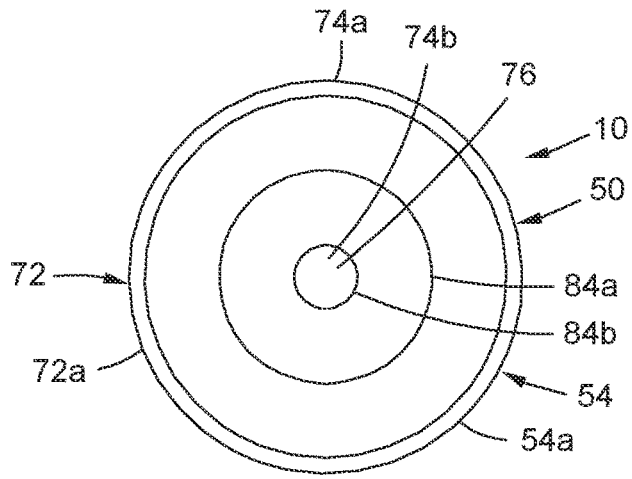
FIG. 1C is an illustration of a top view of the gap measurement tool of FIG. 1A.
Figure 1B:
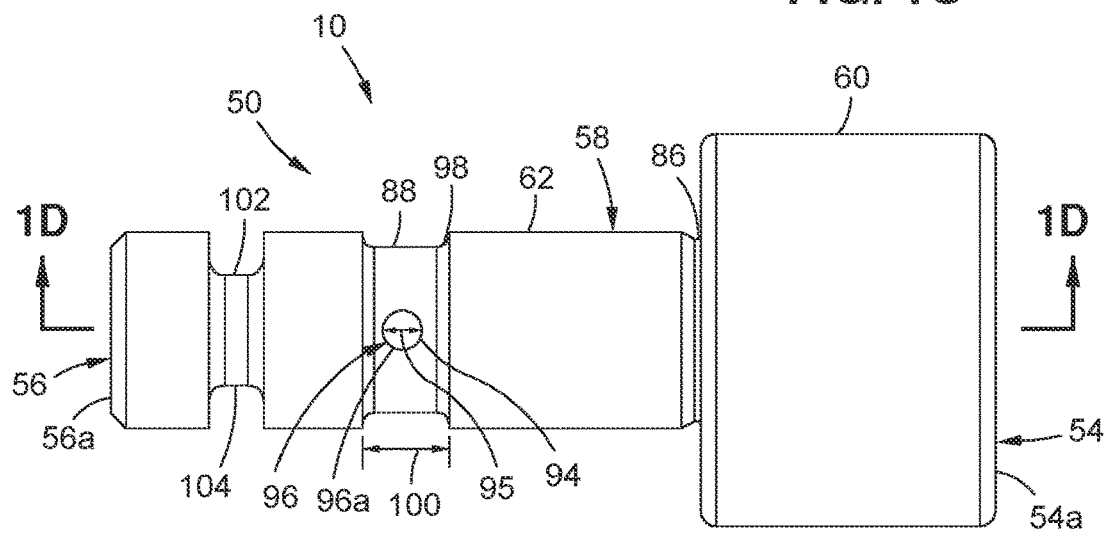
FIG. 1B is an illustration of a side view of the gap measurement tool of FIG. 1A.
Figure 1D:
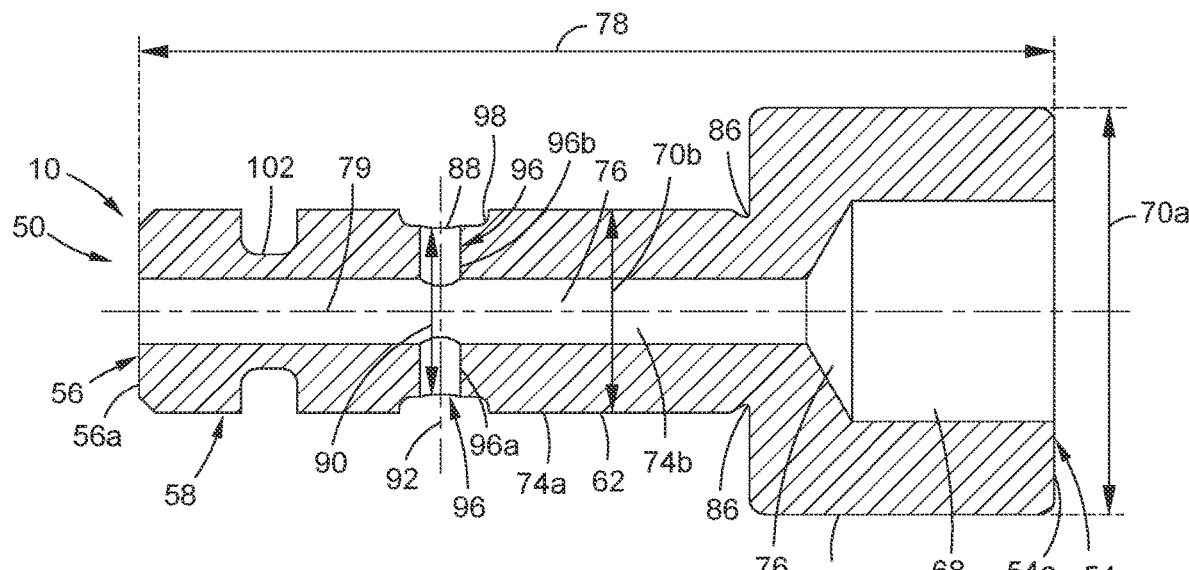
FIG. 1D is an illustration of a cross-section of the gap measurement tool of FIG. 1B, taken along lines 1D-1D.
Figure 1E:
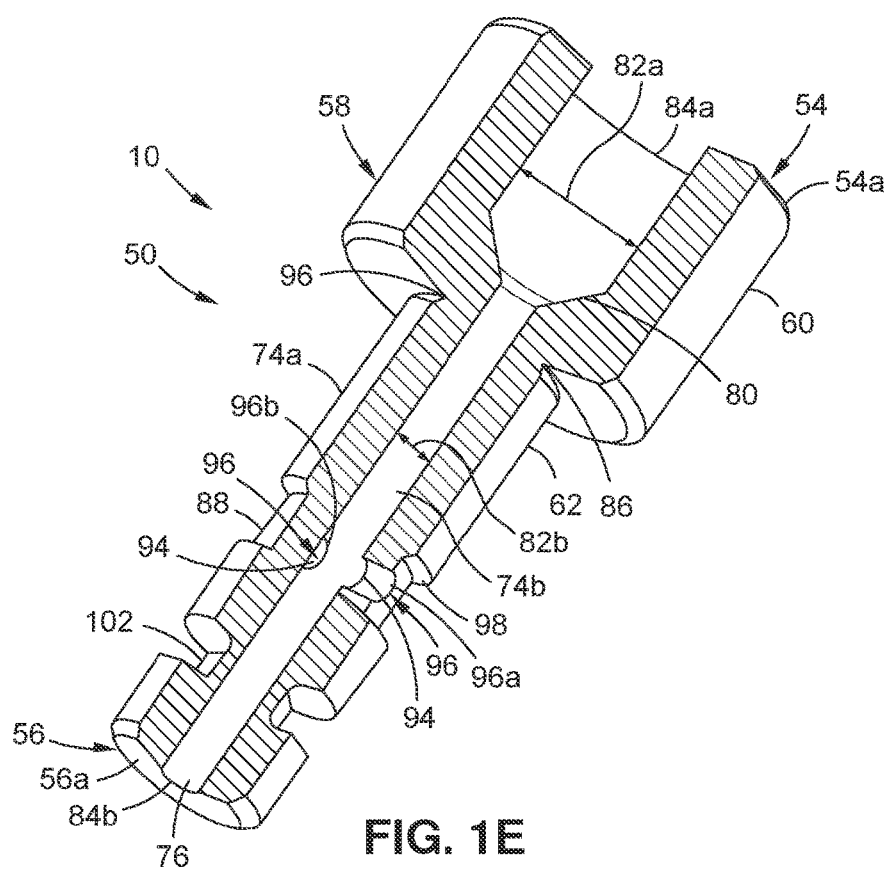
FIG. 1E is an illustration of a partial sectional perspective side view of the gap measurement tool of FIG. 1A.

Now referring to FIGS. 1A-1E, FIGS. 1A-1E show an exemplary version of a gap measurement tool 10 of the disclosure. FIG. 1A is an illustration of a perspective side view of the exemplary version of the gap measurement tool 10. FIG. 1B is an illustration of a side view of the gap measurement tool 10 of FIG. 1A. FIG. 1C is an illustration of a top view of the gap measurement tool 10 of FIG. 1A. FIG. 1D is an illustration of a cross-section of the gap measurement tool 10 of FIG. 1B, taken along lines 1D-1D. FIG. 1E is an illustration of a partial sectional perspective side view of the gap measurement tool 10 of FIG. 1A.

As shown in FIGS. 1A-1E, in one version, the gap measurement tool 10 is in the form of a machined circular mandrel 50 that is configured to fit, and fits, for example, to partially fit, and partially fits, closely or snugly in the through hole 18 and through the mating parts 20 at the gap 16 to be measured. The gap measurement tool 10 is preferably made of a metal material 52 (see FIG. 4) comprising one or more of, stainless steel 52a (see FIG. 4), steel 52b (see FIG. 4), aluminum 52c (see FIG. 4), or another suitable metal material. The gap measurement tool 10 may also be made of another suitably sturdy and durable material. The gap measurement tool 10 is preferably precision machined using a precision machining process. The gap measurement tool 10 may also be 3D (three-dimensional) printed using a 3D (three-dimensional) printing process. In one exemplary version, the gap measurement tool 10 has a length of one (1) inch to two (2) inches. However, the gap measurement tool 10 may have a length of greater than two (2) inches, or may have a length of 0.20 inch to 0.99 inch, depending on the size of the through hole 18, the geometry of the mating parts 20 being measured, and where the gap 16 is located.

As shown in FIGS. 1A-1E, the gap measurement tool 10 comprises a first end 54, such as a proximal end 54a, configured to couple to, or be coupled to, the air gage system 32, and in turn, the air supply source 34. As further shown in FIGS. 1A-1B, 1D-1E, the gap measurement tool 10 comprises a second end 56, such as a distal end 56a, configured to be inserted into the through hole 18 and through the mating parts 20.

As further shown in FIGS. 1A-1B, 1D-1E, the gap measurement tool 10 comprises a body 58 formed between the first end 54 and the second end 56. In one version, as shown in FIGS. 1A-1B, 1D-1E, the body 58 comprises a head portion 60, and a shaft portion 62 coupled to, and extending from, the head portion 60. As shown in FIG. 1A, the head portion 60 has a first end 64a and a second end 64b, and the shaft portion 62 has a first end 66a and a second end 66b. The first end 64a of the head portion 60 comprises an interior connector portion 68 (see FIG. 1D) configured to couple, or attach, to the air gage system 32. As shown in FIG. 1D, the head portion 60 has an outer diameter 70a, and the shaft portion 62 has an outer diameter 70b, and the outer diameter 70a of the head portion 60 is greater than the outer diameter 70b of the shaft portion 62. In one version, the outer diameter 70a of the head portion 60 of the body 58 is ½ (one-half) inch to 1 (one) inch in size, and the outer diameter 70b of the shaft portion 62 of the body 58 is ¼ (one-quarter) inch to ½ (one-half) inch in size, and in proportion to the size of the head portion 60. In other versions, the outer diameter 70a of the head portion 60 is greater than 1 (one) inch and the outer diameter 70b of the shaft portion 62 is greater than ½ (one-half) inch, and in proportion to the size of the head portion 60. Although the body 58 of the gap measurement tool 10, shown in FIGS. 1A-1E, has a head portion 60 and a shaft portion 62, the gap measurement tool 10 may have another suitable design or configuration.

In one version, the head portion 60 (see FIG. 1C) and the shaft portion 62 (see FIG. 1A) comprise an outer cross-section shape 72 (see FIGS. 1A, 1C) in the form of a circle 72a (see FIGS. 1A, 1C). In another version, the head portion 60 (see FIG. 1G) and the shaft portion 62 (see FIG. 1F) comprise an outer cross-section shape 72 (see FIGS. 1F, 1G) in the form of a square 72b (see FIGS. 1F, 1G). In other versions, the head portion 60 and the shaft portion 62 may comprise an outer cross-section shape 72 in the form of a hexagon 72c (see FIG. 4), a triangle 72d (see FIG. 4), or another suitable outer cross-section shape.

As further shown in FIGS. 1C, 1D-1E, the body 58 of the gap measurement tool 10 comprises an exterior 74a and an interior 74b, and a hollow inner channel 76 having a length 78 (see FIG. 1D) extending along a longitudinal axis 79 (see FIG. 1D) through the interior 74b from the first end 54 to the second end 56. As shown in FIG. 1E, in this version, the hollow inner channel 76 has a generally funnel shape 80, where a first diameter 82a of the hollow inner channel 76 in the head portion 60 is greater than a second diameter 82b in the hollow inner channel 74 in the shaft portion 62. In other versions, the hollow inner channel 76 has another suitable shape. As further shown in FIGS. 1C, 1E, the hollow inner channel 76 of the body 58 has a top opening 84a and a bottom opening 84b.

As further shown in FIGS. 1A-1B, 1D-1E, the body 58 of the gap measurement tool 10 comprises an exterior annular crevice 86 formed, or notched, on a portion of the exterior 74a of the body 58. As shown in FIG. 1A, the exterior annular crevice 86 is positioned between the second end 64b of the head portion 60 and the first end 66a of the shaft portion 62. The exterior annular crevice 86 has an annular surface 87 (see FIG. 1A).

The body 58 of the gap measurement tool 10 further comprises a first exterior annular groove 88 (see FIGS. 1A-1B, 1D-1E) formed on another portion of the exterior 74a of the body 58, and positioned distal to the exterior annular crevice 86. The first exterior annular groove 88 has an outer diameter 90 (see FIG. 1D) extending through the interior 74b of the body 58, parallel to axis 92 (see FIG. 1D), and intersecting the hollow inner channel 76 through the interior 74b of the body 58.

The first exterior annular groove 88 further has a cross-hole 94 (see FIGS. 1A-1B, 1E) intersected by the hollow inner channel 76. The cross-hole 94 has a cross-hole diameter 95 (see FIG. 1B). The cross-hole 94 comprises cross-hole openings 96 (see FIGS. 1A-1B, 1D-1E) positioned opposite each other and in alignment with each other. The cross-hole openings 96 comprise a first cross-hole opening 96a (see FIGS. 1A-1B, 1D-1E) positioned opposite a second cross-hole opening 96b (see FIGS. 1D-1E) to form the cross-hole 94. The cross-hole openings 96 are preferably cross-drilled, and are configured to align with, and do align with, the gap 16 between the mating parts 20 when the gap measurement tool assembly 12 is inserted in the through hole 18 through the mating parts 20.

The first exterior annular groove 88 further has an annular slot 98 (see FIGS. 1B, 1D-1E) extending beyond the cross-hole 94 comprising the cross-hole openings 96. The annular slot 98 has a width 100 (see FIG. 1B) that is greater than the cross-hole diameter 95 (see FIG. 1B) of the cross-hole 94, and that is greater than the gap width 30 (see FIGS. 4, 5A-5B) of the gap 16 to be measured between the mating parts 20, to ensure there is a sufficient overlap of the annular slot 98 and to the gap 16 to take the measurement 38.

As shown in FIGS. 1A-1B, 1D-1E, the body 58 of the gap measurement tool 10 further comprises a second exterior annular groove 102 formed on another portion of the exterior 74a of the body 58, and positioned distal to the first exterior annular groove 88 and near the second end 56, such as the distal end 56a, of the gap measurement tool 10. The second exterior annular groove 102 has an annular surface 104 (see FIG. 1A).

Figure 1F:
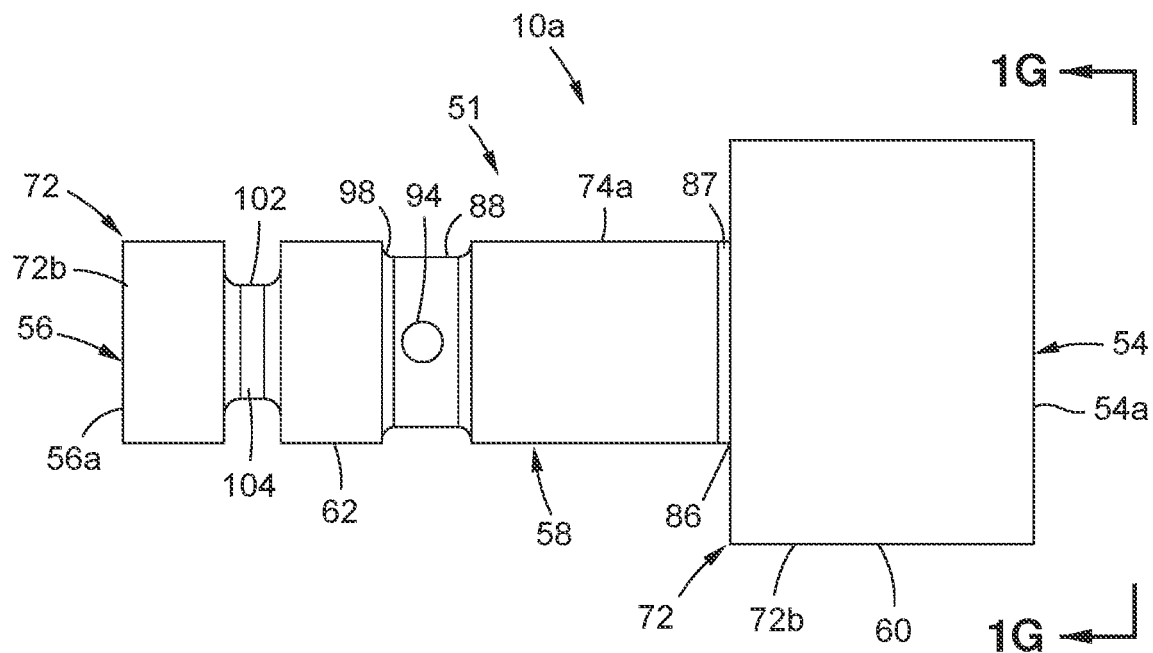
FIG. 1F is an illustration of a perspective side view of another exemplary version of a gap measurement tool of the disclosure.
Figure 1G:
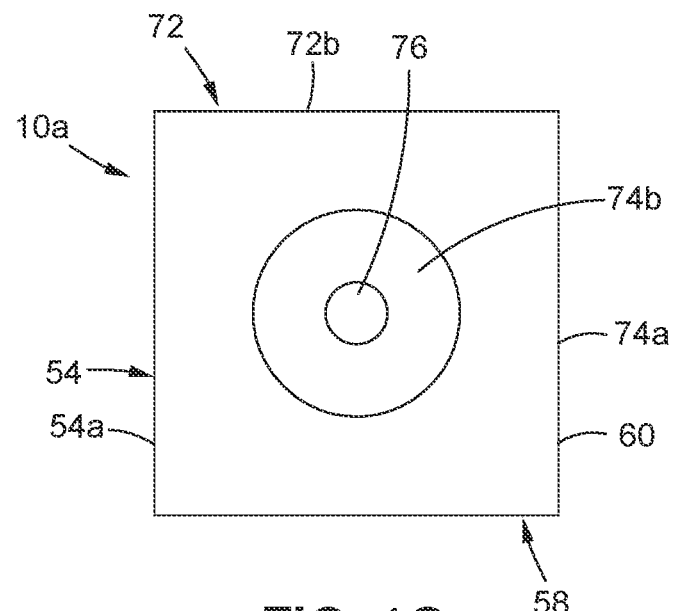
FIG. 1G is an illustration of a top view of the gap measurement tool of FIG. 1F.

Now referring to FIGS. 1F-1G, FIGS. 1F-1G show another exemplary version of a gap measurement tool 10a of the disclosure, such as a machined square mandrel 51, where the head portion 60 (see FIG. 1G) and the shaft portion 62 (see FIG. 1F) of the body 58 (see FIG. 1F) comprise an outer cross-section shape 72 (see FIGS. 1F, 1G) in the form of a square 72b (see FIGS. 1F, 1G). FIG. 1F is an illustration of a perspective side view of the gap measurement tool 10a of the disclosure. FIG. 1G is an illustration of a top view of the gap measurement tool 10a of FIG. 1F.

FIG. 1F shows the gap measurement tool 10a, such as in the form of the machined square mandrel 51, with the first end 54, such as the proximal end 54a, the second end 56, such as the distal end 56a, the body 58 with the exterior 74a and the interior 74b (see FIG. 1G) and the head portion 60 and the shaft portion 62, the exterior annular crevice 86 with the annular surface 87, the first exterior annular groove 88 with the cross-hole 94 and annular slot 98, and the second exterior annular groove 102 with the annular surface 104.

FIG. 1G shows the gap measurement tool 10a with the hollow inner channel 76. FIG. 1G shows the gap measurement tool 10a with the outer cross-section shape 72 in the form of a square 72b, and with the first end 54, such as the proximal end 54a, and the body 58 with the exterior 74a, the interior 74b, the head portion 60, and the hollow inner channel 76.

Figure 2A:
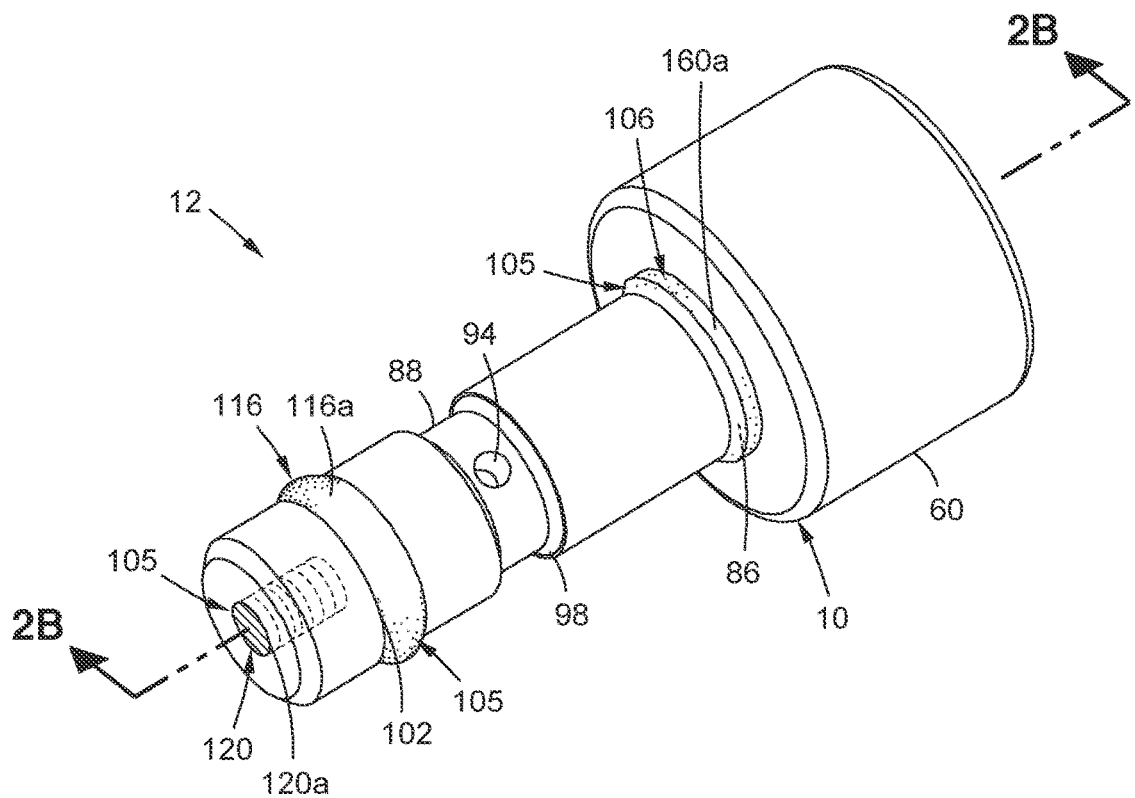
FIG. 2A is an illustration of a perspective side view of an exemplary version of a gap measurement tool assembly of the disclosure.
Figure 2B:
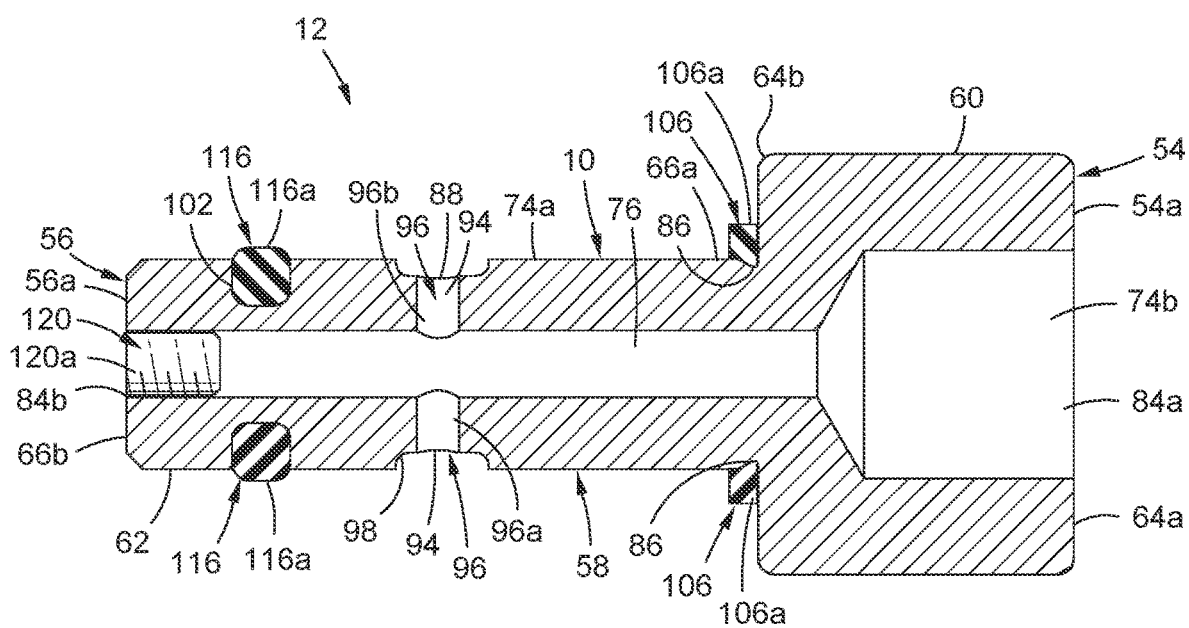
FIG. 2B is an illustration of a cross-section of the gap measurement tool assembly of FIG. 2A.
Figure 2C:
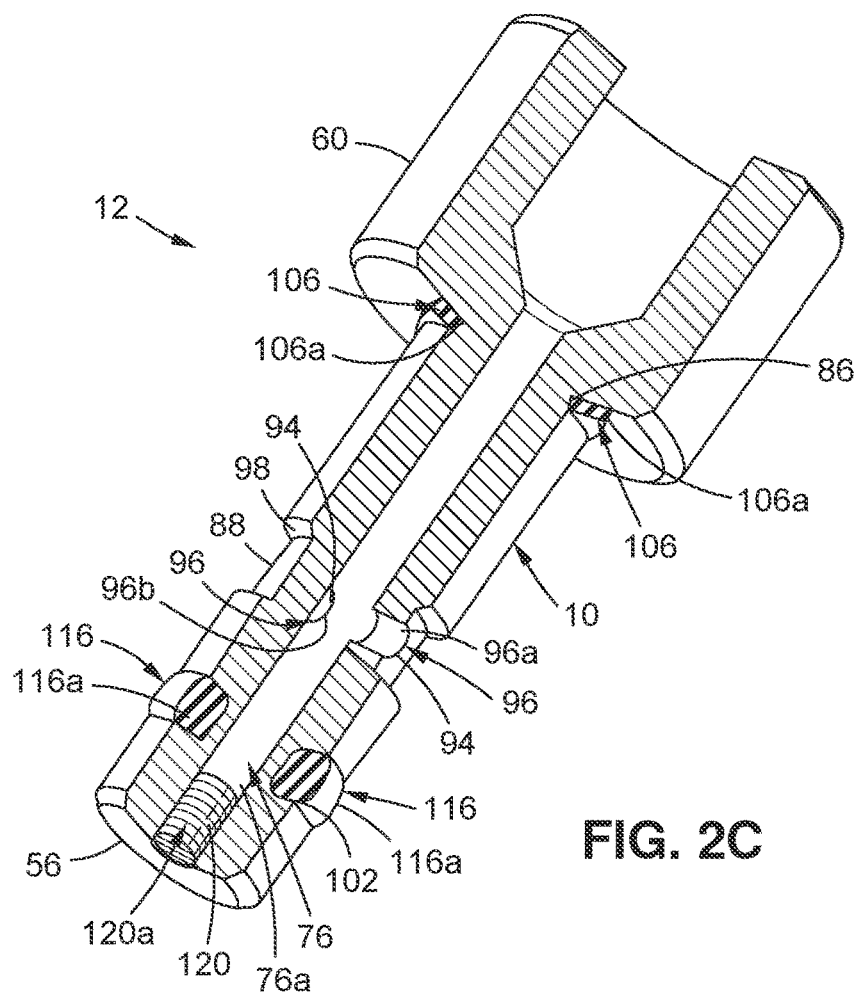
FIG. 2C is an illustration of a partial sectional perspective side view of the gap measurement tool assembly of FIG. 2A.

Now referring to FIGS. 2A-2C, FIGS. 2A-2C show an illustration of an exemplary version of a gap measurement tool assembly 12 of the disclosure. FIG. 2A is a perspective side view of the exemplary version of the gap measurement tool assembly 12 of the disclosure. FIG. 2B is an illustration of a cross-section of the gap measurement tool assembly 12 of FIG. 2A. FIG. 2C is an illustration of a partial sectional perspective side view of the gap measurement tool assembly 12 of FIG. 2A.

As shown in FIGS. 2A-2C, the gap measurement tool assembly 12 comprises the gap measurement tool 10, as discussed above with respect to FIGS. 1A-1E. As shown in FIG. 2B, the gap measurement tool 10 comprises the first end 54, such as the proximal end 54a, configured to couple to the air gage system 32 (see FIGS. 4, 5A-5B) and the air supply source 34 (see FIGS. 4, 5A-5B), comprises the second end 56, such as the distal end 56a, configured to be inserted into the through hole 18 and through the mating parts 20, and comprises the body 58 formed between the first end 54 and the second end 56.

As further shown in FIG. 2B, the body 58 comprises the exterior 74a and the interior 74b, the head portion 60 having the first end 64a and the second end 64b, the shaft portion 62 having the first end 66a and the second end 66b, and the hollow inner channel 76 extending through the interior 74b from the first end 54 of the gap measurement tool 10 to the second end 56 of the gap measurement tool 10. As further shown in FIG. 2B, the hollow inner channel 76 of the body 58 has the top opening 84a and the bottom opening 84b.

FIGS. 2A-2C further show the exterior annular crevice 86. As shown in FIG. 2B, the exterior annular crevice 86 is positioned between the second end 64b of the head portion 60 and the first end 66a of the shaft portion 62.

As shown in FIG. 2A, the gap measurement tool assembly 12 further comprises a plurality of seal elements 105. As shown in FIGS. 2A-2C, the plurality of seal elements 105 of the gap measurement tool assembly 12 comprise a first seal element 106 (see FIGS. 2A-2C), a second seal element 116 (see FIGS. 2A-2C), and a third seal element 120 (see FIGS. 2A-2C).

The first seal element 106 is fitted around, and seated in, the exterior annular crevice 86 (see FIGS. 2A-2C). The first seal element 106 is seated against the annular surface 87 (see FIG. 1A) of the exterior annular crevice 86 (see also FIGS. 2A-2C). The first seal element 106 is a mechanical seal comprising one of, a flat elastomeric seal 106a, a flat gasket seal 106b, or another suitable flat seal element. The first seal element 106 is made of a flexible, durable, and resilient material, such as elastomer or rubber, a polymer material, synthetic rubber copolymer of acrylonitrile (ACN) and butadiene, nitrile butadiene rubber (NBR), silicone, silicone rubbers, neoprene, fluoroelastomers, or another suitable material.

When the gap measurement tool assembly 12 is inserted into the through hole 18 through the mating parts 20 (see FIGS. 5A-5B), or through mating master blocks 21 (see FIG. 3A), the first seal element 106, such as the flat elastomeric seal 106a, is configured to seal, and seals a circumference 108a (see FIGS. 3C, 5A-5B) of the through hole 18 at an entry side 110 (see FIGS. 3C, 5A-5B), or entry point, of the through hole 18. The first seal element 106 is squeezed to prevent air 36, such as compressed air 36a, from leaking out of an interface 112 (see FIGS. 3C, 5A-5B) between the second end 64b of the head portion 60 and a top end 114a (see FIG. 3C) of a first mating master block 21a (see FIG. 3C) or a top end 128a (see FIGS. 5A-5B) of first mating part 20a (see FIGS. 5A-5B). The first seal element 106, such as the flat elastomeric seal 106a, is configured to seal the interface 112 and around the exterior annular crevice 86 to prevent air 36, such as compressed air 36a, from escaping, or leaking.

FIGS. 2A-2C further show the first exterior annular groove 88 positioned distal to the exterior annular crevice 86 and having the cross-hole 94 intersected by the hollow inner channel 76 (see FIGS. 2B-2C). FIGS. 2B-2C show the cross-hole 94 comprising cross-hole openings 96, for example, the first cross-hole opening 96a positioned opposite the second cross-hole opening 96b. FIGS. 2A-2C further show the annular slot 98 of the first exterior annular groove 88.

FIGS. 2A-2C further show the second exterior annular groove 102 positioned distal to the first exterior annular groove 88 and near, or at, the second end 56 (see FIG. 2B), such as the distal end 56a (see FIG. 2B), of the gap measurement tool 10. As shown in FIGS. 2A-2C, the gap measurement tool assembly 12 further comprises the second seal element 116 fitted around, and seated in, the second exterior annular groove 102. The second seal element 116 is seated against the annular surface 104 (see FIG. 1B) of the second exterior annular groove 102. The second seal element 116 is a mechanical seal comprising one of, an O-ring seal 116a (see FIGS. 2A-2C, 3C, 4, 5A-5B), a gasket seal 116b (see FIG. 4), or another suitable seal element. As used herein, "O-ring seal" means a mechanical seal in the shape of a ring or torus having a circular cross-section, and designed to be seated in a groove and compressed during insertion into a through hole, to create a seal.

When the gap measurement tool assembly 12 is inserted into the through hole 18 through the mating parts 20, the second seal element 116 seals a circumference 108*b* (see FIGS. 3C, 5A-5B) of the through hole 18 at, or near, an exit side 118 (see FIGS. 3C, 5A-5B), or exit point, of the through hole 18. The second seal element 116 is made of a flexible, durable, and resilient material, such as elastomer or rubber, a polymer material, synthetic rubber copolymer of acrylonitrile (ACN) and butadiene, nitrile butadiene rubber (NBR), silicone, silicone rubbers, neoprene, fluoroelastomers, or another suitable material.

As shown in FIGS. 2A-2C, the gap measurement tool assembly 12 further comprises the third seal element 120. The third seal element 120 is completely, or partially, inserted into a portion 76*a* (see FIG. 2C) of the hollow inner channel 76 (see FIG. 2C) at the second end 56 (see FIG. 2C) of the gap measurement tool 10 (see FIG. 2C), to seal the second end 56 of the gap measurement tool 10. As shown in FIGS. 2A-2C, the third seal element 120 is a mechanical seal comprising one of, a plug seal 120*a*, a set screw seal 120*b*, for example, a flat point set screw seal or a cup point set screw seal, a threaded screw seal or threaded screw plug, a pressed-in elastomeric seal, or another suitable seal element. When the gap measurement tool assembly 12 is inserted into the through hole 18 through the mating parts 20, the third seal element 120 seals the second end 56 of the gap measurement tool 10, to prevent air 36, such as compressed air 36*a*, from leaking out the second end 56 of the gap measurement tool 10, when the air 36, such as compressed air 36*a*, is passed through the hollow inner channel 76 and into the gap 16. In one version, the third seal element 120 is made of a flexible, durable, and resilient material, such as an elastomer or rubber material, a polymer material, synthetic rubber copolymer of acrylonitrile (ACN) and butadiene, nitrile butadiene rubber (NBR), silicone, silicone rubbers, neoprene, fluoroelastomers, or another suitable material. In another version, the third seal element 120 comprises a metal material, such as one or more of, stainless steel, steel, aluminum, or another suitable metal material.

Figure 3A:
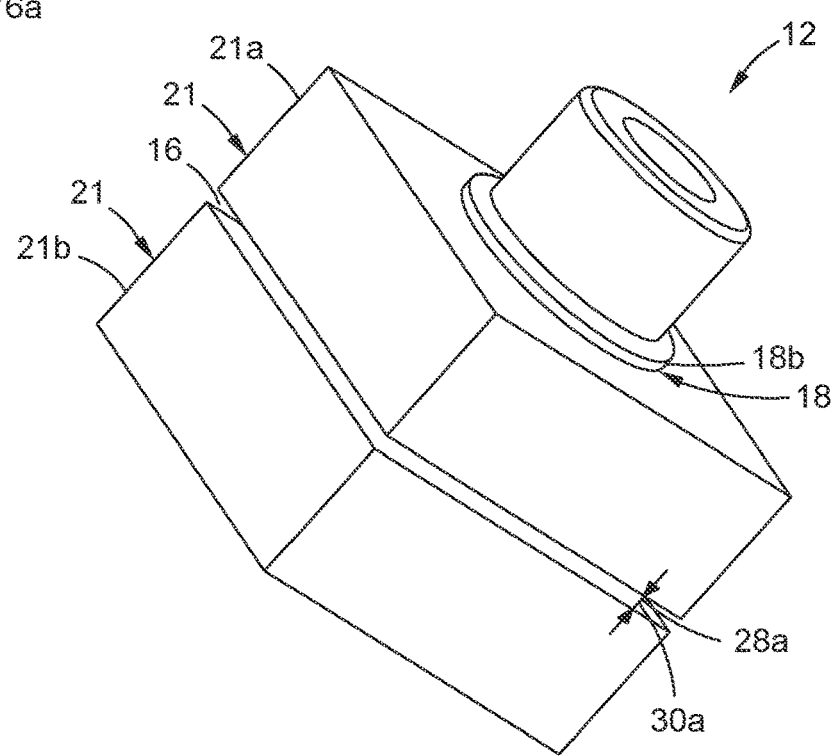
FIG. 3A is an illustration of a perspective side view of an exemplary version of a gap measurement tool assembly of the disclosure, inserted in a through hole through mating master blocks having a known gap size.
Figure 3B:
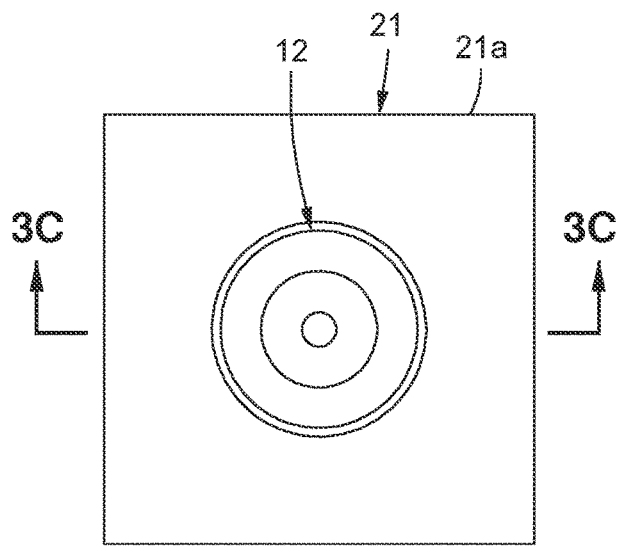
FIG. 3B is an illustration of a top view of the gap measurement tool assembly and a mating master block of FIG. 3A.
Figure 3C:
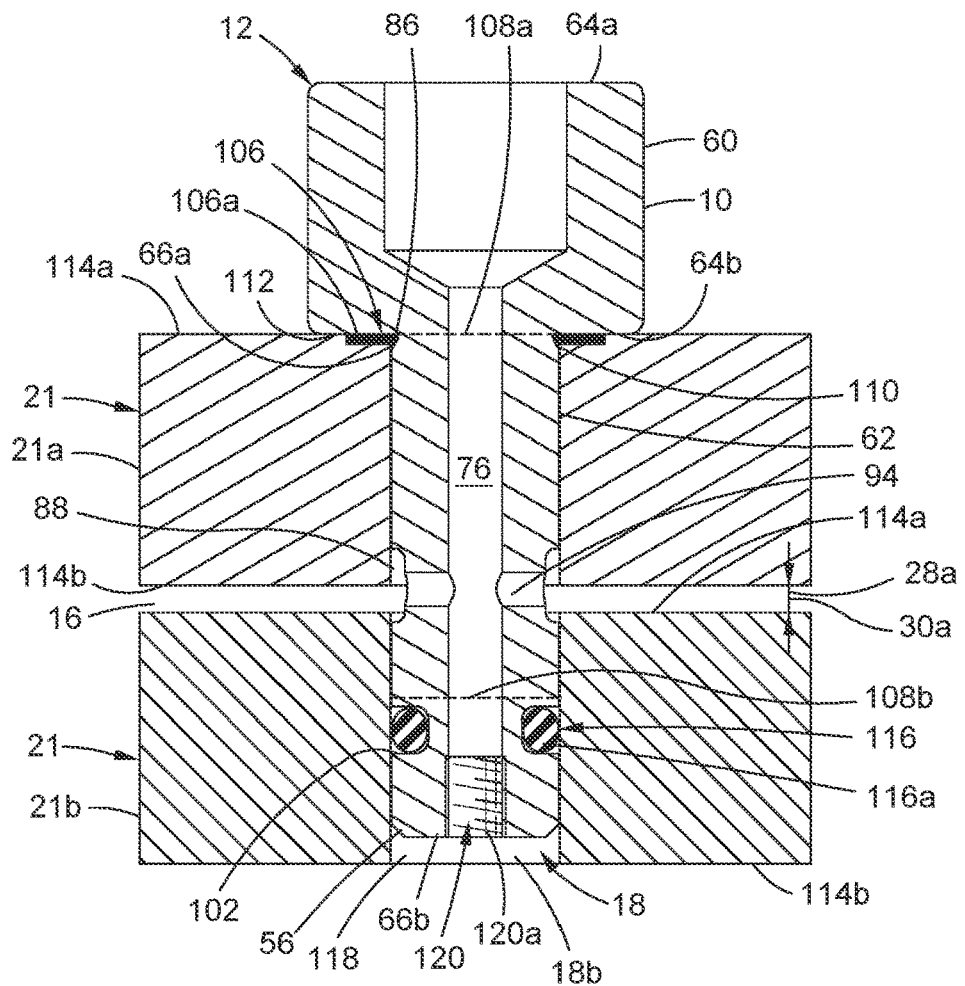
FIG. 3C is an illustration of a cross-section of the gap measurement tool assembly and the mating master block of FIG. 3B, taken along lines 3C-3C.
Figure 3D:
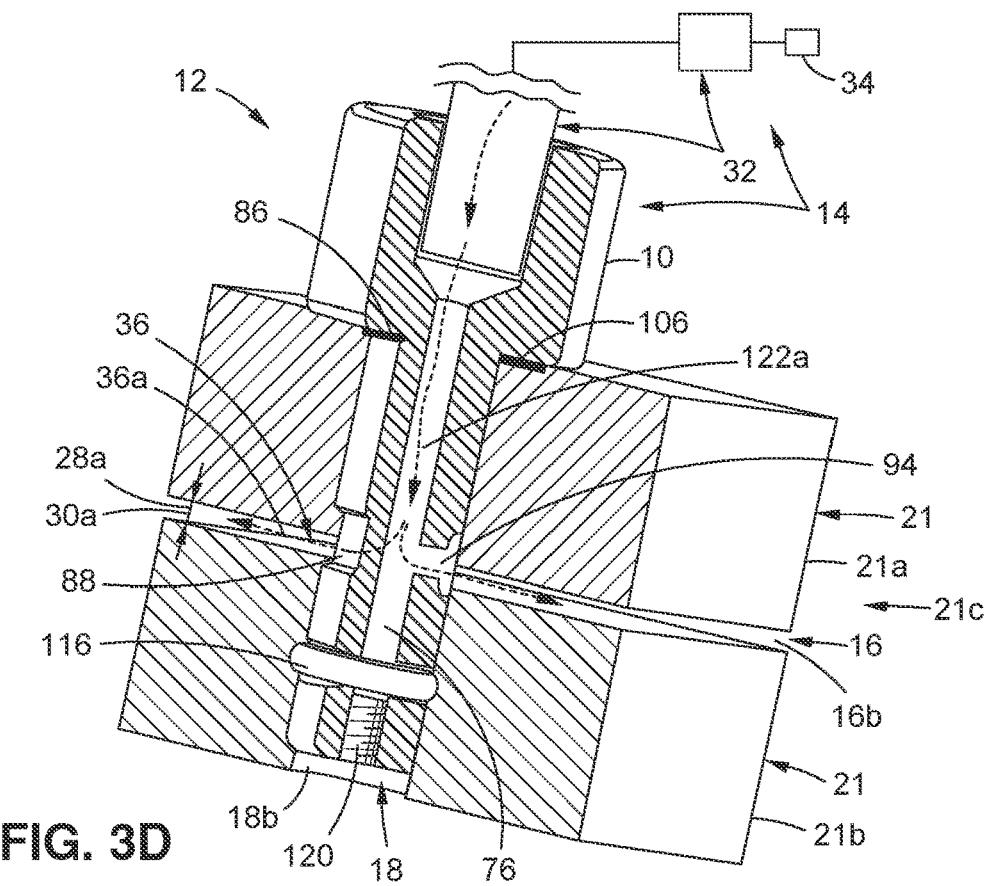
FIG. 3D is an illustration of a partial sectional perspective side view of the gap measurement tool assembly of FIG. 3A, showing an air flow path through the gap measurement tool and a gap having the known gap size between the mating master blocks.
Figure 3E:
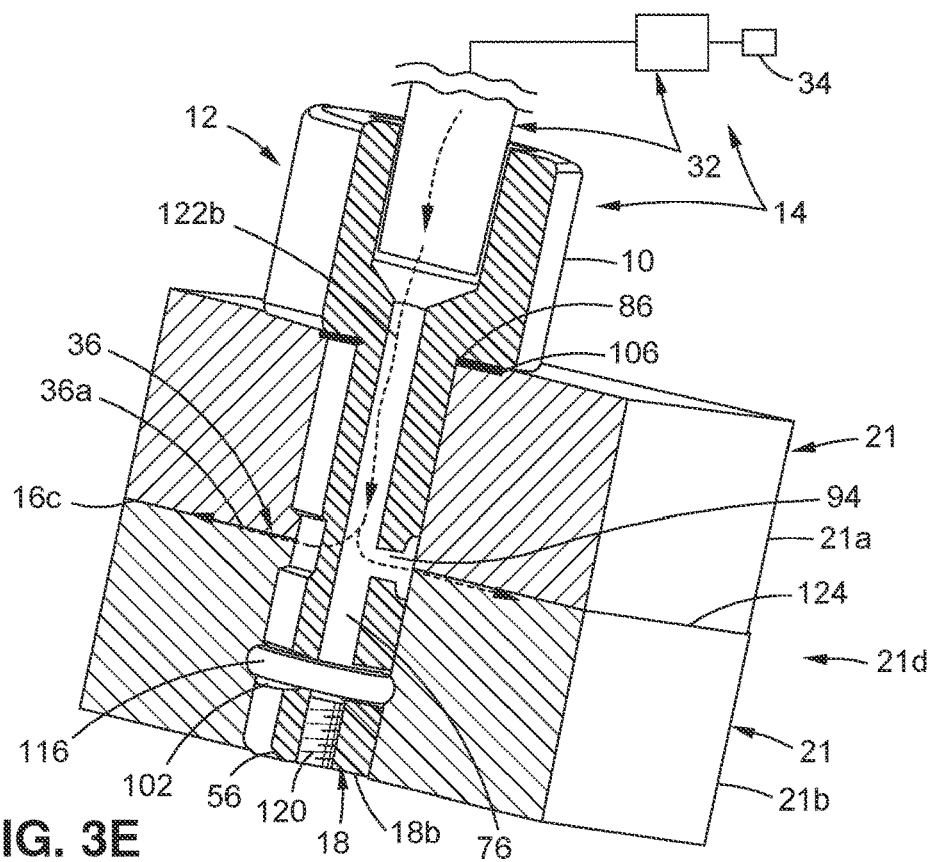
FIG. 3E is an illustration of another partial sectional perspective side view of the gap measurement tool assembly of FIG. 3A, showing an air flow path through the gap measurement tool and no gap between the mating master blocks.

Now referring to FIGS. 3A-3E, FIGS. 3A-3E show an exemplary version of the gap measurement tool assembly 12 of the disclosure, inserted in a through hole 18 (see FIGS. 3A, 3C-3E), such as a master block through hole 18*b* (see FIGS. 3A, 3C-3E), of mating master blocks 21, such as precisely machined master blocks, having a gap 16, such as a precisely machined gap, with a known gap size 28*a* (see FIGS. 3C-3D), such as a known gap width 30*a* (see FIGS. 3C-3D), to calibrate the gap measurement system 14 (see FIGS. 3D-3E). The mating master blocks 21 may be made of stainless steel, steel, chrome, aluminum, tungsten carbide, composite material, or another suitable material, and are manufactured to specific tolerances.

FIG. 3A is an illustration of a perspective side view of an exemplary version of the gap measurement tool assembly 12 of the disclosure, inserted in the through hole 18, such as the master block through hole 18*b*, through the mating master blocks 21, comprising a first mating master block 21*a* and a second mating master block 21*b*, with the gap 16 having the known gap size 28*a*, such as a known gap width 30*a* (see FIGS. 3C-3D) between the mating master blocks 21. FIG. 3B is an illustration of a top view of the gap measurement tool assembly 12 and the mating master block 21 comprising the first mating master block 21*a*, of FIG. 3A.

FIG. 3C is an illustration of a cross-section of the gap measurement tool assembly 12 and the mating master block 21 of FIG. 3B, taken along lines 3C-3C. As shown in FIG. 3C, the gap measurement tool assembly 12 is inserted into the through hole 18, such as the master block through hole 18*b*, through the mating master blocks 21, comprising the first mating master block 21*a* and a second mating master block 21*b*, with the gap 16 having the known gap size 28*a*, such as the known gap width 30*a*, between the mating master blocks 21. As shown in FIG. 3C, each of the mating master blocks 21, comprising the first mating master block 21*a* and the second mating master block 21*b*, has a top end 114*a* and a bottom end 114*b*. FIG. 3C shows the gap measurement tool 10 of the gap measurement tool assembly 12, and shows the head portion 60 with the first end 64*a* and the second end 64*b*, and shows the shaft portion 62 with the first end 66*a* and the second end 66*b*.

As shown in FIG. 3C, with the gap measurement tool assembly 12 inserted into the through hole 18 through the mating master blocks 21, the first seal element 106, such as the flat elastomeric seal 106*a*, seals the circumference 108*a* of the through hole 18 at the entry side 110, or entry point, of the through hole 18. The first seal element 106, such as the flat elastomeric seal 106*a*, seals the interface 112 (see FIG. 3C) between the second end 64*b* of the head portion 60 and the top end 114*a* (see FIG. 3C) of the first mating part 20*a* (see FIG. 3C), and seals around the exterior annular crevice 86 (see FIG. 3C), to prevent air 36 (see FIG. 4), such as compressed air 36*a* (see FIG. 4), from escaping, or leaking, between the head portion 60 and the top end 114*a* of the first mating master block 21*a*, where the head portion 60 rests against the top end 114*a*.

FIG. 3C further shows the first exterior annular groove 88 having the cross-hole 94 aligned with the gap 16 and intersected by the hollow inner channel 76. FIG. 3C further shows the second exterior annular groove 102 with the second seal element 116, such as the O-ring seal 116*a*, fitted around, and seated in, the second exterior annular groove 102. With the gap measurement tool assembly 12 inserted into the through hole 18 through the mating master blocks 21, the second seal element 116 seals the circumference 108*b* (see FIG. 3C) of the through hole 18, at, or near, the exit side 118 (see FIG. 3C), or exit point, of the through hole 18. FIG. 3C further shows the third seal element 120, such as the plug seal 120*a*, inserted into the hollow inner channel 76 at, or near, the second end 56 of the gap measurement tool 10, to seal the second end 56 of the gap measurement tool 10.

FIG. 3D is an illustration of a partial sectional perspective side view of the gap measurement tool assembly 12 of FIG. 3A, showing an air flow path 122*a* from the air gage system 32 and the air supply source 34, through the hollow inner channel 76 of the gap measurement tool 10 and into the gap 16 having the known gap size 28*a*, such as the known gap width 30*a*, between the mating master blocks 21, comprising the first mating master block 21*a* and the second mating master block 21*b*. FIG. 3D shows the gap 16, such as a maximum gap 16*b*, having a large gap area, for the air 36, such as the compressed air 36*a*, to escape. With the maximum gap 16*b*, the back pressure 40 (see FIG. 4) measured by the air gage system 32 is low, and the air flow 42 measured by the air gage system 32 is high. FIG. 3D further shows the cross-hole 94 through the first exterior annular groove 88 aligned with the gap 16. FIG. 3D further shows the gap measurement tool 10 sealed with the first seal element 106 at the exterior annular crevice 86, with the second seal element 116 at the second exterior annular groove 102, and with the third seal element 120 at the second end 56 of the gap measurement tool 10.

FIG. 3E is an illustration of another partial sectional perspective side view of the gap measurement tool assembly 12 of FIG. 3A, showing an air flow path 122b from the air gage system 32 and the air supply source 34, through the hollow inner channel 76 of the gap measurement tool 10 and at a master block interface 124 with a minimum gap 16c, such as no gap or zero gap, or a very small gap area, between the mating master blocks 21, comprising the first mating master block 21a and the second mating master block 21b. With the minimum gap 16c, the back pressure 40 (see FIG. 4) measured by the air gage system 32 is high, and the air flow 42 measured by the air gage system 32 is low.

FIG. 3E further shows the gap measurement tool 10 sealed with the first seal element 106 at the exterior annular crevice 86, with the second seal element 116 at the second exterior annular groove 102, and with the third seal element 120 at the second end 56 of the gap measurement tool 10. FIG. 3E further shows the cross-hole 94 aligned with the minimum gap 16c and intersected by the hollow inner channel 76.

In one version, as shown in FIGS. 3A-3E, the gap measurement system 14 is calibrated with a first set 21c (see FIG. 3D) of mating master blocks 21 (see FIG. 3D) with the known gap size 28a (see FIGS. 3C-3D), such as the known gap width 30a (see FIGS. 3C-3D), between the mating master blocks 21. As shown in FIG. 3D, the known gap size 28a of the first set 21c is for the maximum gap 16b that actual mating parts 20 (see FIG. 4) of a structure 24 (see FIG. 4) would have, for example, 0.005 inch. As shown in FIG. 3E, the gap measurement system 14 is further calibrated with a second set 21d of mating master blocks 21 with the minimum gap 16c, which is zero or no gap, or a very small gap area, between the mating master blocks 21.

By calibrating the gap measurement tool assembly 12 with the first set 21c of mating master blocks 21 of the maximum gap 16b of known gap size 28a, and the second set 21d of mating master blocks 21 with the minimum gap 16c of no gap, or a very small gap area, the range 47 (see FIG. 4) of predetermined gap measurements 46 (see FIG. 4) may be set with the air gage system 32, so that when an unknown measurement is measured, an operator or user can use the maximum gap 16b and the minimum gap 16c measurements to extrapolate measurements in between the maximum gap 16b and the minimum gap 16c measurements. In another version, the gap measurement tool assembly 12 may be calibrated with more than two sets of mating master blocks 21, one set with the maximum gap 16b, one set with the minimum gap 16c, and additional sets with known gap sizes 28a in between the maximum gap 16b and the minimum gap 16c.

Once the gap measurement system 14 is properly mastered or calibrated, an operator or user has the ability to quickly measure gaps 16 between mating parts 20 in a structure 24, such as an aircraft structure 26. The predetermined gap measurement 46 (see FIG. 4) is selected from the range 47 (see FIG. 4) of predetermined gap measurements 46 obtained using the mating master blocks 21 with the known gap sizes 28a, such as the maximum gap 16b and the minimum gap 16c of known gap sizes 28a.

Now referring to FIG. 4, FIG. 4 is an illustration of a block diagram of an exemplary gap measurement system (GMS) 14 having the gap measurement tool assembly 12, as discussed in detail above, for measuring the gap 16 at the through hole 18 between mating parts 20, in accordance with an illustrative version of the disclosure. The blocks in FIG. 4 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustration of the gap measurement system 14 and gap measurement tool assembly 12 in FIG. 4 is not meant to imply physical or architectural limitations to the manner in which an illustrative example may be implemented. Other components in addition to or in place of the ones illustrated may be used. Some components may be unnecessary.

As shown in FIG. 4, the gap measurement system 14 may be in the form of a portable gap measurement system (GMS) 14a (see also FIG. 5A), an automated gap measurement system (GMS) 14b (see FIG. 5B), or another suitable form. The portable gap measurement system 14a is configured to be independently and easily carried, or transported, and is independently and easily carried, or transported, by an operator or user, to the mating parts 20 having the gap 16 to be measured, or to the mating master blocks 21 to calibrate the portable gap measurement system 14a.

The automated gap measurement system 14b comprises the gap measurement system 14 mounted to a robot 125 (see FIGS. 4, 5B). The robot 125 is configured to couple to, or attach to, and couples to, or attaches to, the gap measurement tool assembly 12 (see FIGS. 4, 5B) and the air gage system 32 (see FIGS. 4, 5B) and air supply source 34 (see FIGS. 4, 5B). The automated gap measurement system 14b automatically measures the gap 16 at the through hole 18 between the mating parts 20.

As shown in FIG. 4, the gap measurement system 14 comprises the air gage system 32 and the air supply source 34 coupled to the air gage system 32. The air gage system 32 is configured for coupling to the first end 54 (see FIGS. 4, 5A-5B) of the gap measurement tool 10. The air supply source 34 has air 36 (see FIGS. 4, 5A-5B), such as compressed air 36a (see FIGS. 4, 5A-5B), that is passed into the hollow inner channel 76 (see FIGS. 4, 5-5B) of the gap measurement tool 10, and into the gap 16 (see FIGS. 4, 5A-5B), such as the part interface gap 16a (see FIGS. 4, 5A-5B).

The air gage system 32 is used to take a measurement (MEAS.) 38 (see FIG. 4) of one of, a back pressure 40 (see FIG. 4), an air flow 42 (see FIG. 4), or a differential pressure 44 (see FIG. 4), and is used to correlate the measurement 38 to a predetermined gap measurement (PREDET. GAP MEAS.) 46 (see FIG. 4), to determine the gap size 28 (see FIG. 4) of the gap 16, or gap measurement (MEAS.) 48 (see FIG. 4), at the through hole 18 between the mating parts 20 of the structure 24. The gap measurement system 14 uses only a single measurement (MEAS.) 38a (see FIG. 4) in a one-step process 49 (see FIG. 4), to measure and determine a gap measurement 48 (see FIG. 4), such as the gap size 28 (see FIG. 4), for example, the gap width 30 (see FIG. 4).

As shown in FIG. 4, the gap measurement tool assembly 12 comprises the gap measurement tool 10, and a plurality of seal elements 105. As shown in FIG. 4, the gap measurement tool 10 comprises a metal material 52 such as stainless steel 52a, steel 52b, aluminum 52c, or another suitable metal material. The gap measurement tool 10 may also be made of another suitably sturdy and durable material.

The gap measurement tool 10 comprises the first end 54 (see FIG. 4), configured to couple to, or be coupled to, the air gage system 32, and in turn, to the air supply source 34. The gap measurement tool 10 comprises the second end 56 (see FIG. 4) configured to be inserted into the through hole 18 and through the mating parts 20 or mating master blocks 21. The gap measurement tool 10 further comprises the body 58 (see FIG. 4) formed between the first end 54 and the second end 56, and in one version, comprising the head portion 60 (see FIG. 4) and the shaft portion 62 (see FIG. 4) coupled to, and extending from, the head portion 60. As shown in FIG. 4, the head portion 60 and the shaft portion 62 of the gap measurement tool 10 comprise an outer cross-section shape 72 in the form of one of, a circle 72a, a square 72b, a hexagon 72c, a triangle 72d, or another suitable outer cross-section shape.

As further shown in FIG. 4, and as discussed above in detail, the gap measurement tool 10 comprises the hollow inner channel 76, comprises the exterior (EXT.) annular crevice 86, comprises the first exterior annular groove (AG) 88 positioned distal to the exterior annular crevice 86, and having the cross-hole 94 intersected by the hollow inner channel 76 and having the annular slot 98, and comprises the second exterior (EXT.) annular groove (AG) 102 positioned distal to the first exterior annular groove 88.

As further shown in FIG. 4, and as discussed above in detail, the gap measurement tool assembly 12 comprises the plurality of seal elements 105 comprising, in one version, the first seal element (ELEM.) 106 fitted around the exterior annular crevice 86, the second seal element 116 fitted around the second exterior annular groove 102, and the third seal element 120 inserted into a portion 76a (see FIG. 2C) of the hollow inner channel 76 (see FIG. 2C) at the second end 56 of the gap measurement tool 10. As shown in FIG. 4, the first seal element 106 may comprise a flat elastomeric seal 106a or a flat gasket seal 106b. The first seal element 106 may also comprise another suitable seal element. As shown in FIG. 4, the second seal element 116 may comprise an O-ring seal 116a or a gasket seal 116b. The second seal element 116 may also comprise another suitable seal element. As shown in FIG. 4, the third seal element 120 may comprise a plug seal 120a or a set screw seal 120b. The third seal element 120 may comprise another suitable seal element.

As further shown in FIG. 4, the gap measurement system 14 is coupled, or attached, to the structure 24, such as the aircraft (AC) structure 26, for example, a fuselage section 26a, a tail section 26b, or another suitable aircraft structure. The structure 24 comprises the mating parts (MP) 20 (see FIG. 4), such as aircraft (AC) mating parts 22 (see FIG. 4). As shown in FIG. 4, the mating parts 20 comprise the first mating part (MP) 20a and the second mating part (MP) 20b. The mating parts 20 have the through hole (TH) 18, such as the fastener through hole (TH) 18a, formed or drilled through the mating parts 20. As shown in FIG. 4, the through hole 18 has the entry side 110, or entry point, and the exit side 118, or exit point. The through hole 18 comprises a first through opening 126a (see FIGS. 4, 5A-5B) formed or drilled through the first mating part 20a, and further comprises a second through opening 126b (see FIGS. 4, 5A-5B) formed, or drilled, through the second mating part 20b. The first through opening 126a is aligned with the second through opening 126b to form the through hole 18.

As further shown in FIG. 4, there is a gap 16, such as a part interface gap 16a, between the mating parts 20, such as the first mating part 20a and the second mating part 20b. As shown in FIG. 4, the gap 16, such as the part interface gap 16a, comprises a gap size 28, such as a gap width 30, or another suitable gap size or gap dimension. When mating master blocks 21 (see FIGS. 3A-3E) are used to calibrate the gap measurement system 14, the gap 16, such as the part interface gap 16a, has a known gap size 28a (see FIGS. 3C-3D), such as a known gap width 30a (see FIGS. 3C-3D), or another suitable known gap size or known gap dimension.

When the gap measurement tool assembly 12 of the gap measurement system 14 is inserted into the through hole 18, such as the fastener through hole 18a, and through the mating parts 20, such as the first mating part 20a and the second mating part 20b, so that the cross-hole 94 in the first exterior annular groove 88 is aligned with the gap 16, such as the part interface gap 16a, and the entry side 110 and the exit side 118 of the through hole 18 are properly sealed, the air 36, such as the compressed air 36a, is passed into the gap 16, via the hollow inner channel 76, and the air gage system 32 takes a measurement 38 of one of, the back pressure 40, the air flow 42, or the differential pressure 44, and correlates the measurement 38 to a predetermined gap measurement 46, to determine a gap size 28 of the gap 16 at the through hole 18 between the mating parts 20 of the structure 24.

Now referring to FIG. 5A, FIG. 5A is an illustration of an exemplary version of a gap measurement system 14, such as in the form of a portable gap measurement system 14a, of the disclosure, for measuring the gap 16, such as the part interface gap 16a, at the through hole 18, such as the fastener through hole 18a, between mating parts 20, such as aircraft mating parts 22, of a structure 24, such as an aircraft structure 26, for example, a fuselage section 26a. As shown in FIG. 5A, the structure 24, such as the aircraft structure 26, comprises a fully assembled structure 24a, having multiple through holes 18, such as fastener through holes 18a, configured to each receive a fastener 19, such as a permanent fastener 19a, for example, a rivet, to fasten, or join, the mating parts 20 together. In this version, where one or more gap measurements 48 (see FIG. 4) are desired to be taken on the fully assembled structure 24a, certain of the permanent fasteners 19a are removed from the fastener through holes 18a in order to take the one or more gap measurements 48 with the gap measurement system 14, and certain of the permanent fasteners 19 remain in the through holes 18. As shown in FIG. 5A, each through hole 18 comprises the first through opening 126a formed or drilled through the first mating part 20a, and comprises the second through opening 126b formed, or drilled, through the second mating part 20b, where the first through opening 126a is aligned with the second through opening 126b to form the through hole 18. As shown in FIG. 5A, in one version, the mating parts 20, such as the first mating part 20a and the second mating part 20b, are held together with one or more clamping devices 127, near the through hole 18 in which the gap measurement tool 18 is inserted to take the gap measurement 48. In another version, the mating parts 20, such as the first mating part 20a and the second mating part 20b, are held together with temporary fasteners 19b (see FIG. 5B) inserted through one or both through holes 18 adjacent the through hole 18 in which the gap measurement tool 10 is inserted to take the gap measurement 48. Upon completion of taking the one or more gap measurements 48 for the fully assembled structure 24a, the one or more clamping devices 127 are removed, or the one or more temporary fasteners 19b are removed and replaced with the permanent fasteners 19a installed in the through holes 18. This clamping and/or temporary fastening process allows the fully assembled structure 24a to maintain its structural integrity in the proper assembled state, while the one or more gap measurements 48 are taken.

As shown in FIG. 5A, the gap measurement system 14, such as the portable gap measurement system 14a, comprises the gap measurement tool assembly 12 coupled, or attached, to the air gage system 32, which, in turn, is coupled, or attached, to the air supply source 34. The gap measurement tool assembly 12 is inserted into the through hole 18 and aligned with the gap 16 between the mating parts 20. In particular, as shown in FIG. 5A, the shaft portion 62 of the body 58 of the gap measurement tool 10 of the gap measurement tool assembly 12 is inserted in a through hole 18 through the mating parts 20, in the form of aircraft mating parts 22. As further shown in FIG. 5A, the gap measurement tool 10 has the first end 54 and the second end 56.

As further shown in FIG. 5A, the mating parts 20, in the form of aircraft mating parts 22, comprise the first mating part 20a and the second mating part 20b, in the form of a first aircraft mating part 22a and a second aircraft mating part 22b, having the gap 16, such as the part interface gap 16a. Each of the mating parts 20, comprising the first mating part 20a and the second mating part 20b, has a top end 128a (see FIG. 5A) and a bottom end 128b (see FIG. 5A). The head portion 60 of the gap measurement tool 10 is seated against, and interfaces with, the top end 128a of the first mating part 20a, such as the first aircraft mating part 22a. The mating parts 20 may be made of composite material, metal material, a combination of composite and metal material, or another suitable material.

As shown in FIG. 5A, with the gap measurement tool assembly 12 inserted into the through hole 18, such as the fastener through hole 18a, through the mating parts 20, the first seal element 106, seals the circumference 108a of the through hole 18, at the entry side 110, or entry point, of the through hole 18. As further shown in FIG. 5A, the first seal element 106 seals the interface 112 between the second end 64b of the head portion 60 and the top end 128a of the first mating part 20a, and seals around the exterior annular crevice 86 of the gap measurement tool 10, to prevent air 36, such as compressed air 36a, from escaping, or leaking, between the head portion 60 and the top end 128a of the first mating part 20a, where the head portion 60 rests against the top end 128a.

FIG. 5A further shows the first exterior annular groove 88 having the cross-hole 94 aligned with the gap 16 and intersected by the hollow inner channel 76. FIG. 5A further shows the second exterior annular groove 102 positioned distal to the first exterior annular groove 88, and with the second seal element 116 fitted around, and seated in, the second exterior annular groove 102. As shown in FIG. 5A, with the gap measurement tool assembly 12 inserted into the through hole 18, such as the fastener through hole 18a, through the mating parts 20, the second seal element 116 seals the circumference 108b of the through hole 18, at, or near, the exit side 118, or exit point, of the through hole 18. FIG. 5A further shows the third seal element 120 inserted into the hollow inner channel 76 at, or near, the second end 56 of the gap measurement tool 10, to seal the second end 56 of the gap measurement tool 10.

FIG. 5A shows the air 36, such as the compressed air 36a, flowing from the air gage 130, or air gage probe, of the air gage system 32 inserted in the hollow inner channel 76 in the head portion 60 of the gap measurement tool 10. The air 36, such as the compressed air 36a, flows from the air supply source 34 with the air supply 34a (see FIG. 5A), to the air gage 130, or air gage probe, and through the hollow inner channel 76 of the gap measurement tool 10, and into the gap 16 between the mating parts 20, such as the aircraft mating parts 22.

As shown in FIG. 5A, with the gap measurement tool assembly 12 inserted into the through hole 18 and through the mating parts 20, so that the cross-hole 94 is aligned with the gap 16, and the entry side 110 and the exit side 118 of the through hole 18 are sealed, the air 36, such as the compressed air 36a is passed through the gap 16, via the hollow inner channel 76, and the air gage system 32 takes a measurement 38 (see FIG. 4) of one of, the back pressure 40 (see FIG. 4), then air flow 42 (see FIG. 4), or the differential pressure 44 (see FIG. 4), and correlates the measurement 38 to a predetermined gap measurement 46 (see FIG. 4), to determine a gap size 28, such as gap width 30, of the gap 16 at the through hole 18 between the mating parts 20 of the structure 24.

As shown in FIG. 5A, in one version, the air gage system 32 comprises a non-contact air gage system 32a. As further shown in in FIG. 5A, the air gage system 32 comprises the air gage 130, or air gage probe, having a nozzle tip 132 configured for connection with the interior connector portion 68 within the head portion 60 of the gap measurement tool 10. The nozzle tip 132 may comprise an exterior threaded connection 134, or another suitable connection, to securely attach the air gage 130 to the interior connector portion 68 and to the first end 54 of the gap measurement tool 10 of the gap measurement tool assembly 12. As further shown in FIG. 5A, the air gage 130, or air gage probe, has a handle 135 that is connected to an amplifier 136, via a connection element 138, such as in the form of a first air tube 138a, or air hose.

The amplifier 136 is a device containing the necessary hardware to measure one or more of the back pressure 40, the air flow 42, or the differential pressure 44, depending on the type of amplifier 136 used. As shown in FIG. 5A, in one version, the amplifier 136 has a housing 140 with a flat panel display 142 that displays measurements 38 on a scale 144 as dimensional values 145, such as digitally displayed values, and the housing 140 of the amplifier 136 has connector ports 146, controls 148, red and green status indicators 149, and a universal serial bus (USB) port 150 for insertion of a universal serial bus (USB) memory stick 152 that may be used to transfer measurement data to a computer (not shown). The amplifier 136 provides visual display of the measurements 38 taken, enabling an operator or user to quickly take measurements 38 of back pressure 40, air flow 42, or differential pressure 44.

Figure 6:
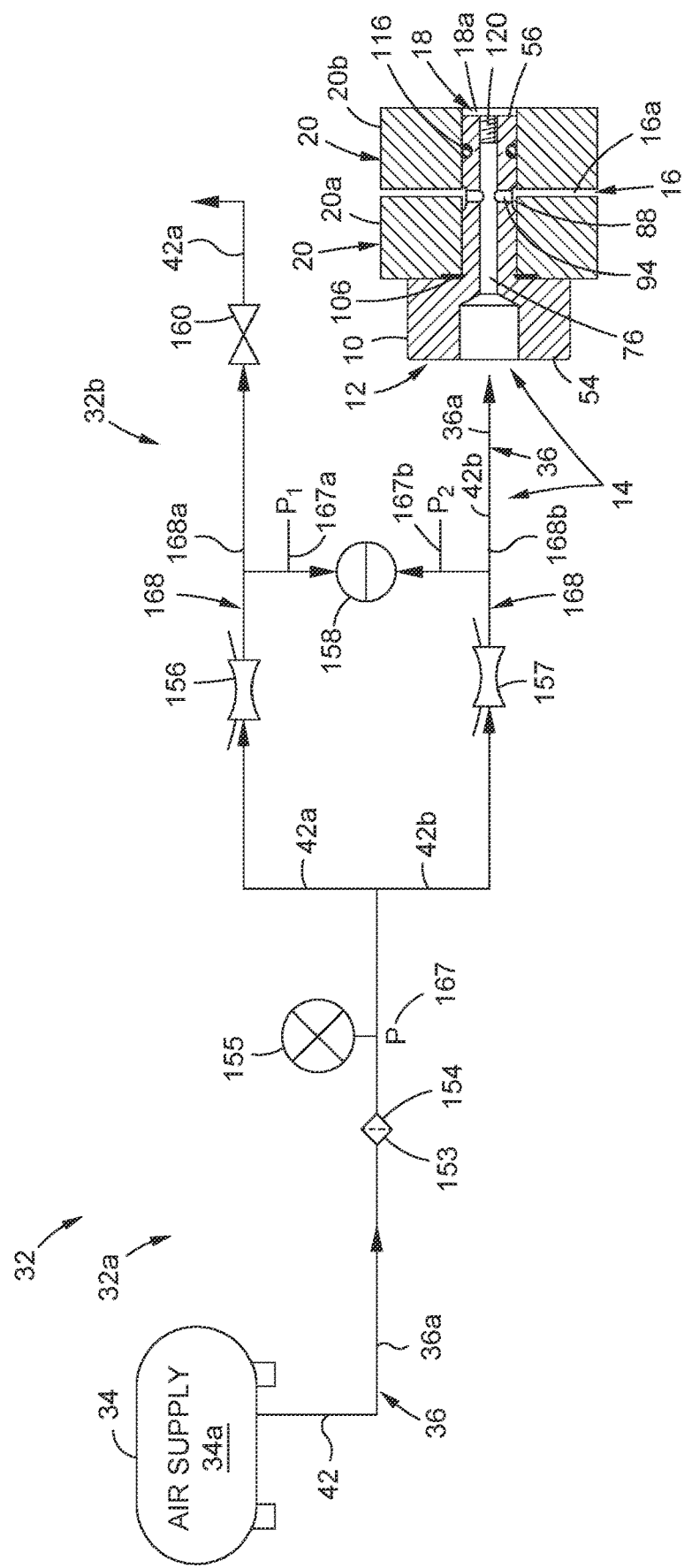
FIG. 6 is an illustration of a schematic diagram of an exemplary version of a differential pressure gauge air gage system and a gap measurement tool assembly of the disclosure.

The air gage system 32, such as the non-contact air gage system 32a, may further comprise one or more of, a filter 153 (see FIG. 6), a pressure regulator 154 (see FIG. 6), a pressure gauge 155 (see FIGS. 5A, 6), an equalizing jet 156 (see FIG. 6) such as a non-adjustable equalizing jet, a master jet 157 (see FIG. 6) such as a non-adjustable master jet, a differential pressure gauge 158 (see FIG. 6), and a zone setting valve 160 (see FIG. 6). The air gage system 32, such as the non-contact air gage system 32a, may further comprise other suitable components and parts.

As further shown in FIG. 5A, the air supply source 34 is connected to the amplifier 136, via a connection element 138, such as in the form of a second air tube 138b, or air hose. The air supply source 34 comprises a sealed container, tank, or other suitable holding element, that holds and stores an air supply 34a (see FIG. 5A) within the air supply source 34. As shown in FIG. 5A, the air supply source 34 is coupled to the pressure gauge 155.

Now referring to FIG. 5B, FIG. 5B is an illustration of an exemplary version of a gap measurement system 14, such as in the form of an automated gap measurement system 14b, of the disclosure, coupled to a robot 125, to automatically measure the gap 16, such as the part interface gap 16a, at the through hole 18, such as the fastener through hole 18a, between the mating parts 20, such as the first mating part 20a and the second mating part 20b. As shown in FIG. 5B, the structure 24 comprises a partially assembled structure 24b, having multiple through holes 18, such as fastener through holes 18a, configured to each receive a fastener 19, such as a temporary fastener 19b, for example, a temporary rivet, bolt, screw, or other suitable fastener, to temporarily fasten, or join, the mating parts 20 together. In this version, where one or more gap measurements 48 (see FIG. 4) are desired to be taken on the partially assembled structure 24b, certain of the temporary fasteners 19b are removed from the fastener through holes 18a in order to take the one or more gap measurements 48 with the gap measurement system 14, and certain of the temporary fasteners 19b remain in the through holes 18. As shown in FIG. 5A, each through hole 18 comprises the first through opening 126a formed or drilled through the first mating part 20a, and comprises the second through opening 126b formed, or drilled, through the second mating part 20b, where the first through opening 126a is aligned with the second through opening 126b to form the through hole 18. As shown in FIG. 5B, in one version, the mating parts 20, such as the first mating part 20a and the second mating part 20b, are held together with one or more clamping devices 127, and one or more temporary fasteners 19b, near the through hole 18 in which the gap measurement tool 18 is inserted to take the gap measurement 48. In another version, the mating parts 20, such as the first mating part 20a and the second mating part 20b, may be held together only with temporary fasteners 19b inserted through one or both through holes 18 adjacent the through hole 18 in which the gap measurement tool 10 is inserted to take the gap measurement 48. After one gap measurement 48 is taken, the gap 16 at the through hole 18 that was measured may be clamped and a different temporary fastener 19b may be removed in order to take an additional gap measurement 48 with the gap measurement system 14. Upon completion of taking the one or more gap measurements 48 for the partially assembled structure 24b, the one or more clamping devices 127 are removed, and/or the one or more temporary fasteners 19b are removed and replaced with permanent fasteners 19a (see FIG. 5A) that are installed. This clamping and/or temporary fastening process allows the partially assembled structure 24b to maintain its structural integrity in the proper assembled state, while the one or more gap measurements 48 are taken.

As shown in FIG. 5B, the robot 125 comprises a robotic arm 162 having a first end 163a attached to an end effector 164 and a second end 163b attached to a gantry 165. The end effector 164 is coupled, or attached, to the handle 135 of the air gage 130 of the air gage system 32, such as the non-contact air gage system 32a. As shown in FIG. 5B, the gantry 165 has a platform 166 for holding the amplifier 136 of the air gage system 32 and for holding the air supply source 34. The robot 125 may be controlled with a control unit, such as in the form of a computer numerical control (CNC) machine, having one or more computers, for controlling the robot 125. The robot 125 is powered with a power unit for providing power to the robot 125. The control unit and the power unit may be connected to the robot 125 by one or more connections, such as wired or wireless connections.

As shown in FIG. 5B, the gap measurement system 14, such as the automated gap measurement system 14b, comprises the gap measurement tool assembly 12 coupled, or attached, to the air gage system 32, which, in turn, is coupled, or attached, to the air supply source 34. The gap measurement tool assembly 12 is inserted into the through hole 18 and aligned with the gap 16 between the mating parts 20. In particular, as shown in FIG. 5B, the shaft portion 62 of the body 58 of the gap measurement tool 10 of the gap measurement tool assembly 12 is inserted in a through hole 18 through the mating parts 20. As further shown in FIG. 5B, the gap measurement tool 10 has the first end 54 and the second end 56.

As further shown in FIG. 5B, the mating parts 20 comprise the first mating part 20a and the second mating part 20b, having the gap 16, such as the part interface gap 16a, between the mating parts 20. Each of the mating parts 20, comprising the first mating part 20a and the second mating part 20b, has the top end 128a (see FIG. 5B) and the bottom end 128b (see FIG. 5B). The head portion 60 of the gap measurement tool 10 is seated against, and interfaces with, the top end 128a of the first mating part 20a. The mating parts 20 may be made of composite material, metal material, a combination of composite and metal material, or another suitable material.

As shown in FIG. 5B, with the gap measurement tool assembly 12 inserted into the through hole 18, such as the fastener through hole 18a, through the mating parts 20, the first seal element 106, seals the circumference 108a of the through hole 18, at the entry side 110, or entry point, of the through hole 18. As further shown in FIG. 5B, the first seal element 106 seals the interface 112 between the second end 64b of the head portion 60 and the top end 128a of the first mating part 20a, and seals around the exterior annular crevice 86 of the gap measurement tool 10, to prevent air 36, such as compressed air 36a, from escaping, or leaking, between the head portion 60 and the top end 128a of the first mating part 20a, where the head portion 60 rests against the top end 128a.

FIG. 5B further shows the first exterior annular groove 88 having the cross-hole 94 aligned with the gap 16 and intersected by the hollow inner channel 76. FIG. 5B further shows the second exterior annular groove 102 positioned distal to the first exterior annular groove 88, and with the second seal element 116 fitted around, and seated in, the second exterior annular groove 102. As shown in FIG. 5B, with the gap measurement tool assembly 12 inserted into the through hole 18, such as the fastener through hole 18a, through the mating parts 20, the second seal element 116 seals the circumference 108b of the through hole 18, at, or near, the exit side 118, or exit point, of the through hole 18. FIG. 5B further shows the third seal element 120 inserted into the hollow inner channel 76 at, or near, the second end 56 of the gap measurement tool 10, to seal the second end 56 of the gap measurement tool 10.

FIG. 5B shows the air 36, such as the compressed air 36a, flowing from the air gage 130, or air gage probe, of the air gage system 32 inserted in the hollow inner channel 76 in the head portion 60 of the gap measurement tool 10. The air 36, such as the compressed air 36a, flows from the air supply source 34 with the air supply 34a (see FIG. 5B), to the air gage 130, or air gage probe, and through the hollow inner channel 76 of the gap measurement tool 10, and into the gap 16 between the mating parts 20, such as the aircraft mating parts 22.

As shown in FIG. 5B, with the gap measurement tool assembly 12 inserted into the through hole 18 and through the mating parts 20, so that the cross-hole 94 is aligned with the gap 16, and the entry side 110 and the exit side 118 of the through hole 18 are sealed, the air 36, such as the compressed air 36a is passed through the gap 16, via the hollow inner channel 76, and the air gage system 32 takes the measurement 38 (see FIG. 4) of one of, the back pressure 40 (see FIG. 4), the air flow 42 (see FIG. 4), or the differential pressure 44 (see FIG. 4), and correlates the measurement 38 to a predetermined gap measurement 46 (see FIG. 4), to determine the gap size 28, such as the gap width 30, of the gap 16 at the through hole 18 between the mating parts 20 of the structure 24.

As shown in FIG. 5B, in one version, the air gage system 32 comprises a non-contact air gage system 32a. As further shown in in FIG. 5B, the air gage system 32 comprises the air gage 130, or air gage probe, having the nozzle tip 132 with the exterior threaded connection 134 configured for connection with the interior connector portion 68 within the head portion 60 of the gap measurement tool 10 and to the first end 54 of the gap measurement tool 10 of the gap measurement tool assembly 12. As further shown in FIG. 5B, the air gage 130, or air gage probe, has the handle 135 that is connected to the amplifier 136, via the connection element 138, such as in the form of the first air tube 138a, or air hose. As shown in FIG. 5B, in one version, the amplifier 136 has the housing 140 with the flat panel display 142 that displays measurements 38 on the scale 144 as dimensional values 145, such as digitally displayed values, and the housing 140 of the amplifier 136 has connector ports 146, controls 148, red and green status indicators 149, and the universal serial bus (USB) port 150 for insertion of a universal serial bus (USB) memory stick 152.

The air gage system 32, such as the non-contact air gage system 32a, may further comprise one or more of, a filter 153 (see FIG. 6), a pressure regulator 154 (see FIG. 6), a pressure gauge 155 (see FIGS. 5B, 6), an equalizing jet 156 (see FIG. 6) such as a non-adjustable equalizing jet, a master jet 157 (see FIG. 6) such as a non-adjustable master jet, a differential pressure gauge 158 (see FIG. 6), and a zone setting valve 160 (see FIG. 6). The air gage system 32, such as the non-contact air gage system 32a, may further comprise other suitable components and parts.

As further shown in FIG. 5B, the air supply source 34 is connected to the amplifier 136, via the connection element 138, such as in the form of the second air tube 138b, or air hose. The air supply source 34 comprises a sealed container, tank, or other suitable holding element, that holds and stores the air supply 34a (see FIG. 5B) within the air supply source 34. As shown in FIG. 5B, the air supply source 34 is coupled to the pressure gauge 155.

Now referring to FIG. 6, FIG. 6 is an illustration of a schematic diagram of an exemplary version of an air gage system 32, such as a non-contact air gage system 32a, for example, a differential pressure gauge air gage system 32b, and a gap measurement tool assembly 12 of the disclosure. As shown in FIG. 6, with the differential pressure gauge air gage system 32b, the air flow 42 of air 36, such as compressed air 36a, flows from the air supply 34a in the air supply source 34, through the filter 153, and through the pressure regulator 154. The pressure regulator 154 controls pressure (P) 167 (see FIG. 6), such as pneumatic pressure, of the air flow 42 of the air 36, such as the compressed air 36a, and provides consistent pressure 167 of the air flow 42 of the air 36, such as the compressed air 36a, to the amplifier 136 (see FIGS. 5A-5B). The pressure gauge 155 (see FIG. 6) monitors and measures the pressure 167 of the air flow 42 of the air 36, such as the compressed air 36a.

As shown in FIG. 6, the air flow 42 splits into two channels 168, including a reference channel 168a, or base channel, that acts as a reference or base measurement, and including a measuring channel 168b that performs the measuring. As further shown in FIG. 6, air flow 42a flows through the equalizing jet 156, such as the non-adjustable equalizing jet, to the reference channel 168a. The air flow 42a in the reference channel 168a flows to the zone setting valve 160 and out of the differential pressure gauge air gage system 32b, and this air flow 42a has a first pressure P1 167a measured and monitored by the differential pressure gauge 158.

As further shown in FIG. 6, air flow 42b flows through the master jet 157, such as the non-adjustable master jet, to the measuring channel 168b. The air flow 42b in the measuring channel 168b flows from the differential pressure gauge air gage system 32b to the gap measurement tool assembly 12 and out of gap 16, and this air flow 42b has a second pressure P2 167b measured and monitored by the differential pressure gauge 158.

The differential pressure gauge 158 measures the difference between the second pressure P2 167b of the air flow 42b flowing out of the gap measurement tool assembly 12 and out of gap 16 and the first pressure P1 167a of the air flow 42a flowing out of the differential pressure gauge air gage system 32b. Leakage of air 36, such as compressed air 36a, through the gap measurement tool assembly 12 and the gap 16 causes a corresponding change in the differential pressure 44 (see FIG. 4) and is proportional to the gap size 28 (see FIG. 4), such as gap width 30 (see FIG. 4) of the gap 16.

FIG. 6 further shows the gap measurement system 14 comprising the gap measurement tool assembly 12 receiving the air 36, such as the compressed air 36a, from the air gage system 32, such as the non-contact air gage system 32a, for example, the differential pressure gauge air gage system 32b, and the air supply source 34. FIG. 6 further shows the gap measurement tool 10 with the first end 54, the second end 56, the hollow inner channel 76, the first exterior annular groove 88 with the cross-hole 94 intersected by the hollow inner channel 76, and the cross-hole 94 aligned with the gap 16, such as the part interface gap 16a. FIG. 6 further shows the first seal element 106, the second seal element 116, and the third seal element 120 of the gap measurement tool assembly 12. FIG. 6 further shows the gap measurement tool assembly 12 partially inserted in the through hole 18, such as the fastener through hole 18a, through the mating parts 20, such as the first mating part 20a and the second mating part 20b.

Figure 7:
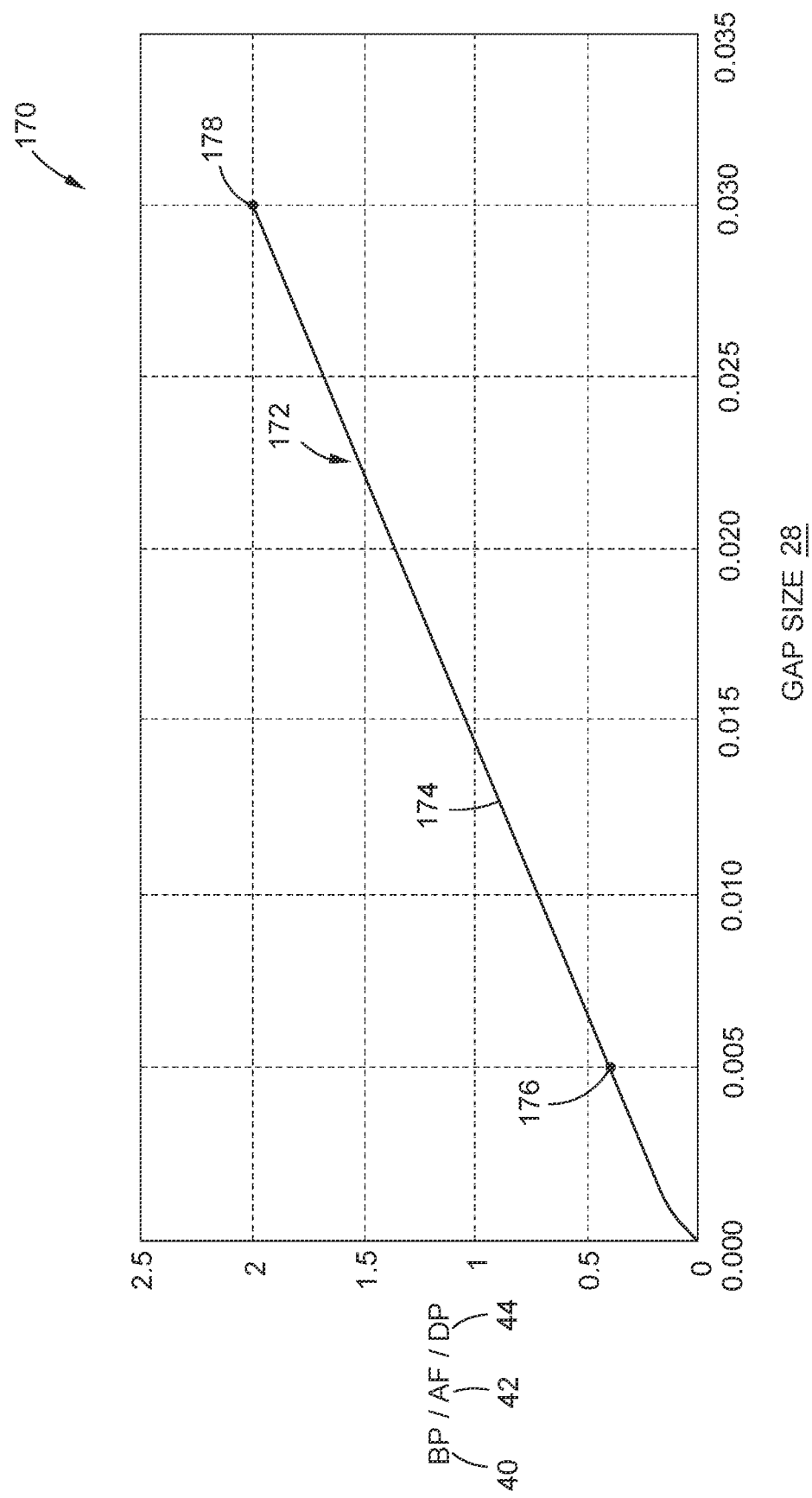
FIG. 7 is an illustration of a graph showing a correlation between gap size and back pressure, air flow, and differential pressure.

Now referring to FIG. 7, FIG. 7 is an illustration of a graph 170 with a plot line 172 showing a correlation between gap size 28, such as gap width 30 (see FIGS. 4, 5A-5B), and back pressure 40, air flow 42, and differential pressure 44, depending on which is measured with the gap measurement system 14 (see FIGS. 4, 5A-5B). As shown in FIG. 7, the graph 170 shows gap size 28 along the x-axis, and shows back pressure (BP) 40, air flow (AF) 42, and differential pressure (DP) 44 along the y-axis. The plot line 172 shows a linear range 174 representing a linear relationship established by using two mating master blocks 21 (see FIGS. 3A-3C) with gaps 16 that are precisely machined to establish the linear equation used. The plot line 172 further shows a first master point 176 obtained using one set of mating master blocks 21 having one known gap size 28a, and further shows a second master point 178 obtained using another set of mating master blocks 21 having another known gap size 28. Once the gap measurement system 14 (see FIGS. 4, 5A-5B) is properly mastered or calibrated, an operator or user can quickly measure gaps 16 (see FIGS. 4, 5A-5B) between mating parts 20 (see FIGS. 4, 5A-5B) in a structure 24 (see FIGS. 4, 5A-5B), such as an aircraft structure 26 (see FIGS. 4, 5A).

Figure 8:
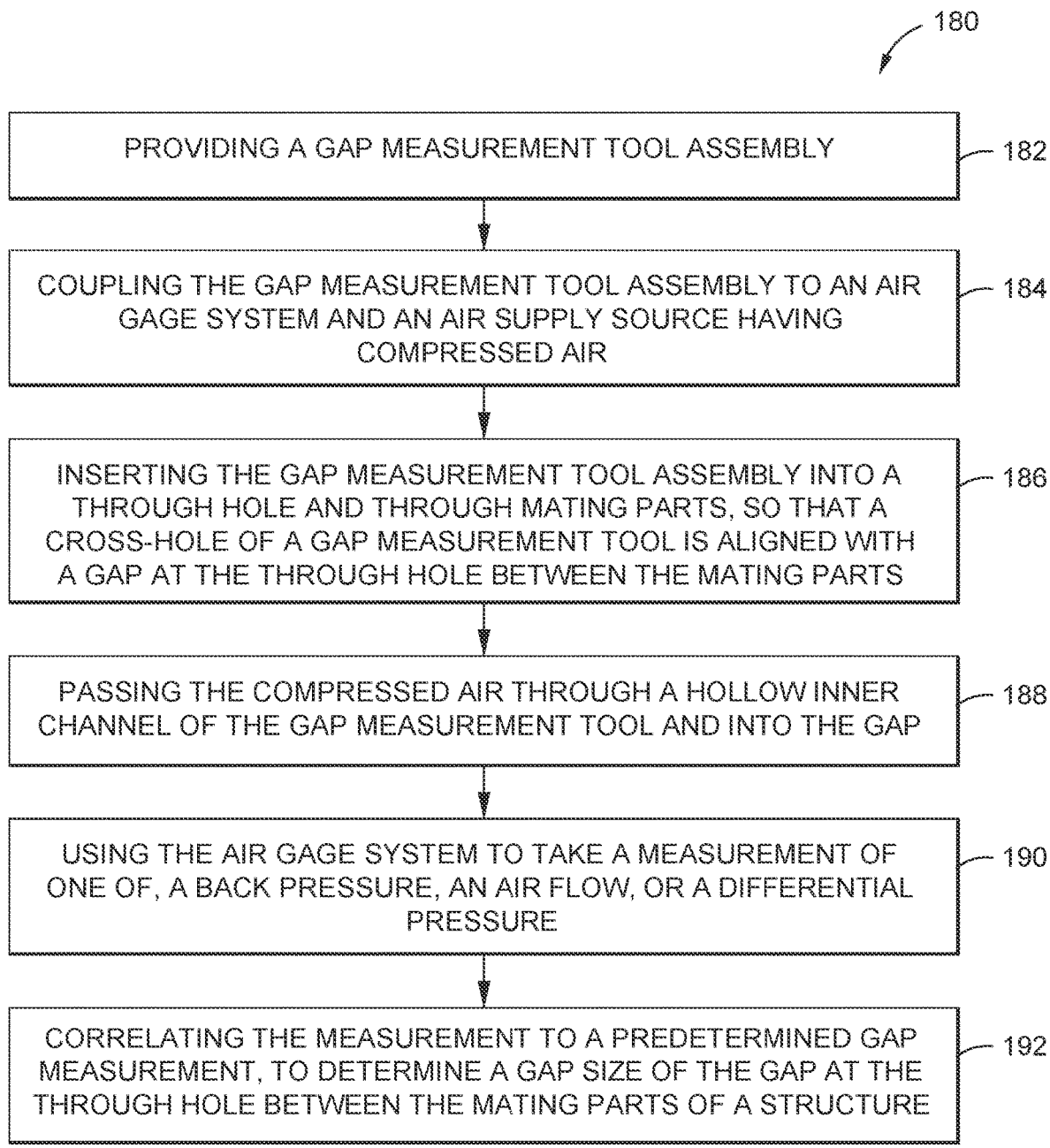
FIG. 8 is an illustration of a flow diagram of an exemplary version of a method of the disclosure.

Now referring to FIG. 8, FIG. 8 is an illustration of a flow diagram of an exemplary version of a method 180 of the disclosure. In another version of the disclosure, there is provided the method 180 for measuring a gap 16 (see FIGS. 4, 5A-5B) at a through hole 18 (see FIGS. 4, 5A-5B), such as a fastener through hole 18a (see FIGS. 4, 5A-5B), between mating parts 20 (see FIGS. 4, 5A-5B) of a structure 24 (see FIGS. 4, 5A-5B), such as an aircraft structure 26 (see FIG. 4). The structure 24 may comprise a fully assembled structure 24a (see FIG. 5A), or a partially assembled structure 24b (see FIG. 5B).

The blocks in FIG. 8 represent operations and/or portions thereof, or elements, and lines connecting the various blocks do not imply any particular order or dependency of the operations or portions thereof, or elements. FIG. 8 and the disclosure of the steps of the method 180 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 8, the method 180 comprises the step of providing 182 a gap measurement tool assembly 12 (see FIGS. 2A, 4, 5A-5B). As discussed in detail above, the gap measurement tool assembly 12 comprises a gap measurement tool 10 (see FIGS. 1A-1G, 4) comprising a first end 54 (see FIGS. 1A, 4), such as a proximal end 54a (see FIG. 1A), a second end 56 (see FIGS. 1A, 4), such as a distal end 56a (see FIG. 1A), and a body 58 (see FIGS. 1A, 4) formed between the first end 54 and the second end 56. The body 58 comprises a hollow inner channel 76 (see FIGS. 1D, 4), an exterior annular crevice 86 (see FIGS. 1A, 4), a first exterior annular groove 88 (see FIGS. 1A, 4) positioned distal to the exterior annular crevice 86 and having a cross-hole 94 (see FIGS. 1D, 4) intersected by the hollow inner channel 76, and a second exterior annular groove 102 (see FIGS. 1A, 4) positioned distal to the first exterior annular groove 88.

The gap measurement tool assembly 12 further comprises a plurality of seal elements 105 (see FIG. 4) comprising the first seal element 106 (see FIGS. 2A-2C, 4) fitted around the exterior annular crevice 86. The plurality of seal elements 105 of the gap measurement tool assembly 12 further comprises the second seal element 116 (see FIGS. 2A-2C, 4) fitted around the second exterior annular groove 102. The plurality of seal elements 105 of the gap measurement tool assembly 12 further comprises the third seal element 120 (see FIGS. 2A-2C, 4) inserted into a portion 76a (see FIG. 2C) of the hollow inner channel 76 (see FIG. 2C) at the second end 56 (see FIG. 2C) of the gap measurement tool 10 (see FIG. 2C).

As shown in FIG. 8, the method 180 further comprises the step of coupling 184 the gap measurement tool assembly 12 to an air gage system 32 (see FIGS. 4, 5A-5B) and an air supply source 34 (see FIGS. 4, 5A-5B) coupled to the air gage system 32. The air supply source 34 contains and supplies air 36 (see FIGS. 4, 5A-5B), such as compressed air 36a (see FIGS. 4, 5A-5B). The gap measurement tool assembly 12, the air gage system 32, and the air supply source 34 comprise, and obtain, the gap measurement system 14 (see FIGS. 4, 5A-5B).

As shown in FIG. 8, the method 180 further comprises the step of inserting 186 the gap measurement tool assembly 12 into the through hole 18 (see FIGS. 4, 5A-5B), such as the fastener through hole 18a (see FIGS. 4, 5A-5B), and through the mating parts 20 (see FIGS. 4, 5A-5B), such as the first mating part 20a (see FIGS. 4, 5A-5B) and the second mating part 20b (see FIGS. 4, 5A-5B), so that the cross-hole 94 (see FIGS. 4, 5A-5B) of the gap measurement tool 10 is aligned with the gap 16 (see FIGS. 4, 5A-5B), such as the part interface gap 16a (see FIGS. 4, 5A-5B), at the through hole 18 between the mating parts 20. The entry side 110 (see FIGS. 4, 5A-5B) and the exit side 118 (see FIGS. 4, 5A-5B) of the through hole 18 are sealed with the first seal element 106 and the second seal element 116, respectively.

The step of inserting 186 the gap measurement tool assembly 12 into the through hole 18 and through the mating parts 20, further comprises sealing, with the first seal element 106 (see FIGS. 5A-5B), the circumference 108a (see FIGS. 5A-5B) of the through hole 18 (see FIGS. 5A-5B) at the entry side 110 (see FIGS. 5A-5B), or entry point, of the through hole 18. The step of inserting 186 the gap measurement tool assembly 12 into the through hole 18 and through the mating parts 20, further comprises, sealing, with the second seal element 116 (see FIGS. 5A-5B), the circumference 108b (see FIGS. 5A-5B) of the through hole 18 at, or near, the exit side 118 (see FIGS. 5A-5B) of the through hole 18. The step of inserting 186 the gap measurement tool assembly 12 into the through hole 18 and through the mating parts 20, further comprises, sealing, with the third seal element 120 (see FIGS. 5A-5B), the second end 56 (see FIGS. 5A-5B) of the gap measurement tool 10. The step of inserting 186 the gap measurement tool assembly 12 into the through hole 18 and through the mating parts 20, further comprises, inserting 186 the gap measurement tool assembly 12 into the through hole 18 comprising the fastener through hole 18a (see FIG. 4), and through the mating parts 20 comprising aircraft mating parts 22 (see FIG. 4) of the structure 24 comprising the aircraft structure 26 (see FIG. 4), such as the fuselage section 26a (see FIG. 4), the tail section 26b (see FIG. 4), or another suitable aircraft structure.

As shown in FIG. 8, the method 180 further comprises the step of passing 188 the air 36 (see FIGS. 4, 5A-5B), such as the compressed air 36a (see FIGS. 4, 5A-5B), through the hollow inner channel 76 (see FIGS. 4, 5A-5B) of the gap measurement tool 10 (see FIGS. 4, 5A-5B) and into the gap 16 (see FIGS. 4, 5A-5B), such as the part interface gap 16a (see FIGS. 4, 5A-5B).

As shown in FIG. 8, the method 180 further comprises the step of using 190 the air gage system 32 to take a measurement 38 (see FIG. 4) of one of, a back pressure 40 (see FIG. 4), an air flow 42 (see FIG. 4), or a differential pressure 44 (see FIG. 4).

As shown in FIG. 8, the method 180 further comprises the step of correlating 192 the measurement 38 (see FIG. 4) of one of, the back pressure 40, the air flow 42, or the differential pressure 44, to a predetermined gap measurement 46 (see FIG. 4), to determine a gap size 28 (see FIG. 4) of the gap 16, such as a part interface gap 16a, at the through hole 18 between the mating parts 20 of the structure 24.

Before the step of inserting 186 the gap measurement tool assembly 12 into the through hole 18 and through the mating parts 20, the method 180 may include the step of calibrating the gap measurement system 14 (see FIGS. 3D-3E, 4) using mating master blocks 21 (see FIGS. 3A-3E) that are precisely machined and have gaps 16 (see FIGS. 3C-3E) that are precisely machined and have known gap sizes 28a (see FIGS. 3C-3D), such as known gap widths 30a (see FIGS. 3C-3D), to obtain a range 47 (see FIG. 4) of predetermined gap measurements 46 (see FIG. 4). The gap measurement system 14 may be calibrated by inserting the gap measurement tool assembly 12 into the through hole 18 (see FIG. 3C), such as a master block through hole 18b (see FIG. 3C), between mating master blocks 21, passing the air 36, such as compressed air 36a, through the hollow inner channel 76 of the gap measurement tool 10 and into the gap 16 (see FIGS. 3D-3E), such as the maximum gap 16b (see FIG. 3D), or the minimum gap 16c (see FIG. 3E), having a known gap size 28a (see FIGS. 3D-3E) between the mating master blocks 21, using the air gage system 32 (see FIGS. 3D-3E) to take a measurement 38 (see FIG. 4) of one of, a back pressure 40 (see FIG. 4), an air flow 42 (see FIG. 4), or a differential pressure 44 (see FIG. 4), and preparing the range 47 (see FIG. 4) of predetermined gap measurements 46 (see FIG. 4). The amount of air 36, such as compressed air 36a, passed into the gap 16 is measured and the back pressure 40, air flow 42, or differential pressure 44, is correlated to the gap size 28 (see FIG. 4) the gap 16 (see FIG. 4). Further, a pressure signal of the back pressure 40 measured may be digitally converted, using the amplifier 136, to an equivalent gap and mapped by using sets of mating master blocks 21, such as the first set 21c (see FIG. 3D) and the second set 21d (see FIG. 3E) representing two defined gaps 16, such as the maximum gap 16b (see FIG. 3D) and the minimum gap 16c (see FIG. 3E), respectively. The amplifier 136 (see FIGS. 5A-5B) displays on the flat panel display 142 (see FIGS. 5A-5B) the gap size 28. After the appropriate pressure correlations are made using the mating master blocks 21, the gap measurement system 14 can be used to quickly measure the gap 16 in the through hole 18 in a fraction of the time of known methods, such as those using known feeler gauges. After proper calibration, the gap measurement tool assembly 12 of the gap measurement system 14 can be quickly inserted into a through hole 18 between mating parts 20, such as aircraft mating parts 22, and a gap measurement 48 of the gap size 28 of the gap 16 is made.

The method 180 may further comprise, after the step of coupling 184 the gap measurement tool assembly 12 to the air gage system 32 and the air supply source 34, to obtain the gap measurement system 14, the step of mounting the gap measurement system 14 to a robot 125 (see FIGS. 4, 5B), to obtain an automated gap measurement system 14a (see FIGS. 4, 5B) that automatically measures the gap 16 at the through hole 18 between the mating parts 20. In one version, the gap measurement system 14 is the automated gap measurement system 14b (see FIGS. 4, 5B). In another version, the gap measurement system 14 is a portable gap measurement system 14a (see FIGS. 4, 5A) configured to be independently carried, or transported, for example, by an operator or user, to the mating parts 20 having the gap 16 to be measured at the through hole 18 between the mating parts 20.

Figure 9:
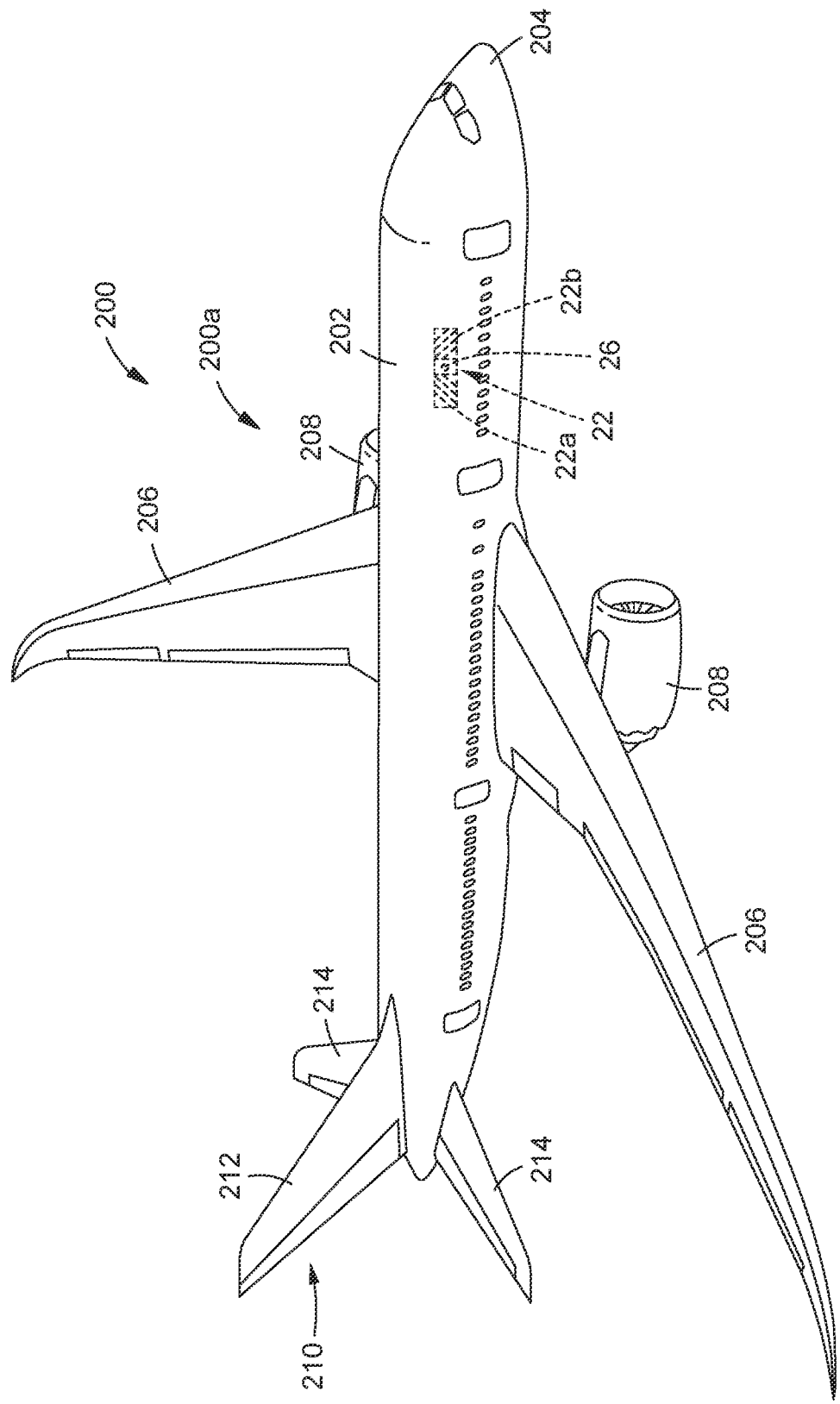
FIG. 9 is an illustration of a perspective view of an aircraft incorporating assembled aircraft parts that may be measured for gaps using exemplary versions of a gap measurement tool assembly, a gap measurement system, and a method of the disclosure.

Now referring to FIG. 9, FIG. 9 is an illustration of a perspective view of a vehicle 200, such as an aircraft 200a, incorporating aircraft mating parts 22 that may be measured for gaps 16 (see FIGS. 4, 5A-5B), such as part interface gaps 16a (see FIGS. 4, 5A-5B), using exemplary versions of the gap measurement tool assembly 12 (see FIGS. 2A-2C, 4), the gap measurement system 14 (see FIGS. 4, 5A-5B), and the method 180 of the disclosure. As shown in FIG. 9, the vehicle 200, such as the aircraft 200a, includes a fuselage 202, a nose 204, wings 206, engines 208, and an empennage 210. As shown in FIG. 9, the empennage 210 comprises a vertical stabilizer 212 and horizontal stabilizers 214. In one illustrative version, as shown in FIG. 9, the aircraft mating parts 22 comprise a first aircraft mating part 22a and a second aircraft mating part 22b joined together with one or more fasteners 19 (see FIGS. 5A-5B), such as one or more permanent fasteners 19a (see FIG. 5A), for example, one or more rivets, bolts, screws, or other suitable fasteners, to form the aircraft structure 26, for example, the fuselage section 26a (see FIG. 4). The vehicle 200 may also include rotorcraft, spacecraft, watercraft, and other suitable vehicles.

Figure 10:
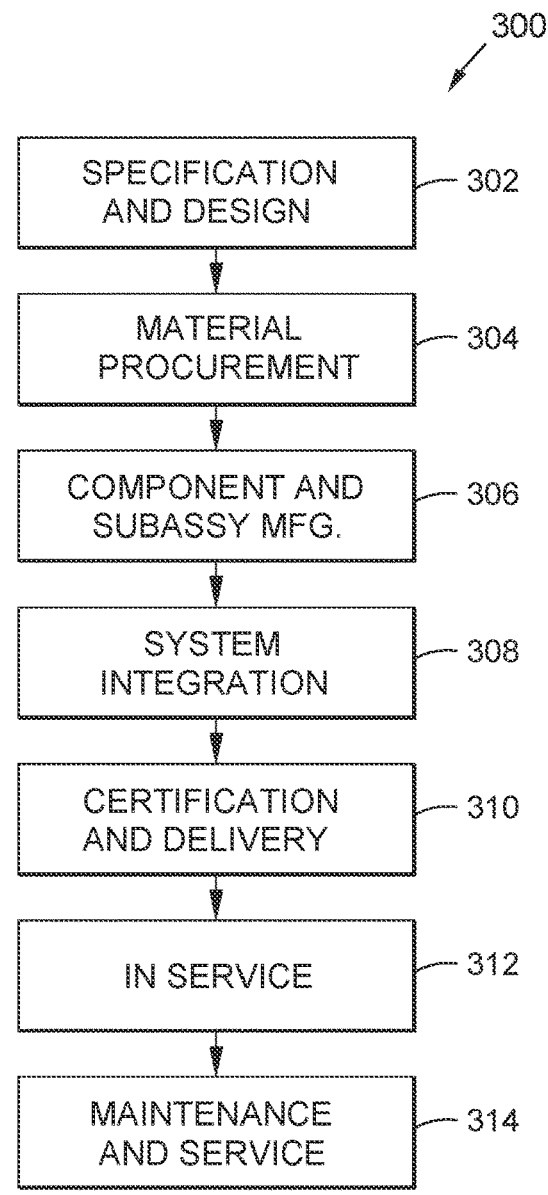
FIG. 10 is an illustration of a flow diagram of an exemplary aircraft manufacturing and service method.
Figure 11:
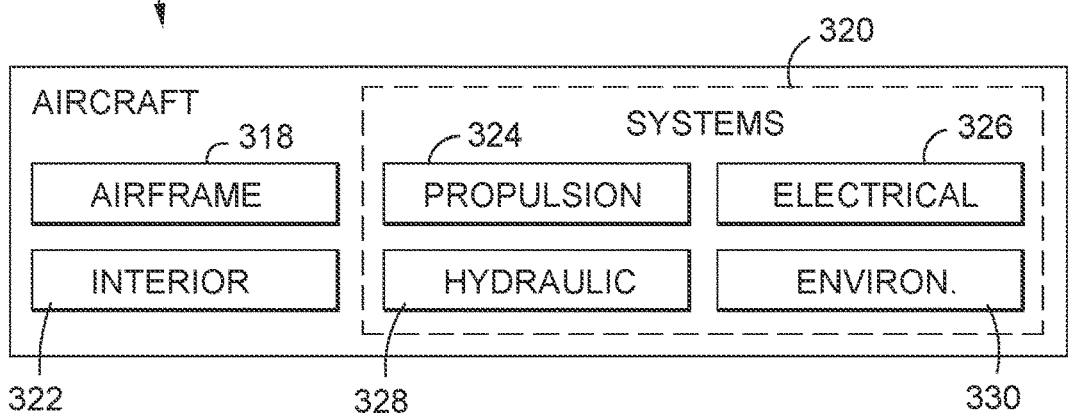
FIG. 11 is an illustration of an exemplary block diagram of an aircraft.

Now referring to FIGS. 10 and 11, FIG. 10 is an illustration of a flow diagram of an exemplary aircraft manufacturing and service method 300, and FIG. 11 is an illustration of an exemplary block diagram of an aircraft 316. Referring to FIGS. 10 and 11, versions of the disclosure may be described in the context of the aircraft manufacturing and service method 300 as shown in FIG. 10, and the aircraft 316 as shown in FIG. 11.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 11, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the gap measurement tool assembly 12 (see FIGS. 2A-2C), the gap measurement system 14 (see FIGS. 4, 5A-5B), and the method 180 (see FIG. 8) allow for the measuring of gaps 16 (see FIGS. 4, 5A-5B), such as part interface gaps 16a (see FIGS. 4, 5A-5B), between mating parts 20 (see FIGS. 4, 5A-5B), such as aircraft mating parts 22 (see FIGS. 4, 5A), of a structure 24 (see FIGS. 4, 5A-5B), such as an aircraft structure 26 (see FIGS. 4, 5A), for example, large aircraft assemblies such as a fuselage section 26a (see FIGS. 4, 5A), a tail section 26b (see FIG. 4), or another suitable aircraft structure, and greatly reduce the time to measure thousands of gaps 16 in aircraft sections and assemblies. In particular, disclosed versions of the gap measurement tool assembly 12 (see FIGS. 2A-2C), the gap measurement system 14 (see FIGS. 4, 5A-5B), and the method 180 (see FIG. 8) allow for conducting gap analysis at join sections for a cylindrical object such as a fuselage 202 (see FIG. 9). Disclosed versions of the gap measurement tool assembly 12 (see FIGS. 2A-2C), the gap measurement system 14 (see FIGS. 4, 5A-5B), and the method 180 (see FIG. 8) may also be used in other applications where gaps 16 are measured between mating parts 20.

In addition, disclosed versions of the gap measurement tool assembly 12 (see FIGS. 2A-2C), the gap measurement system 14 (see FIGS. 4, 5A-5B), and the method 180 (see FIG. 8), provide for measuring of gaps 16 between mating parts 20 where the measuring is fast, simple, stable, a one-step process 49 (see FIG. 4) with a single measurement 38a (see FIG. 4), may be automated with an automated gap measurement system 14b (see FIG. 4) mounted to a robot 125 (see FIG. 4), and is accurate, robust, and repeatable. Further, the disclosed gap measurement tool assembly 12 (see FIGS. 2A-2C) and gap measurement system 14 (see FIGS. 4, 5A-5B) provide a lightweight solution, including a portable gap measurement system 14a (see FIG. 5A) option, that avoids ergonomic challenges for operators or users, as compared to known gap check systems.

Moreover, disclosed versions of the gap measurement tool assembly 12 (see FIGS. 2A-2C), the gap measurement system 14 (see FIGS. 4, 5A-5B), and the method 180 (see FIG. 8), avoid manually gap checking mating parts with a known feeler gage or a known modified feel gage having a 90 degree bend, avoid multiple gap checks with successively larger and larger feeler gages until the largest size that fits in the gap is established, avoid a two-step gap checking process, and avoid reliance on operator "feel" when gap checking. Further, disclosed versions of the gap measurement tool assembly 12 (see FIGS. 2A-2C), the gap measurement system 14 (see FIGS. 4, 5A-5B), and the method 180 (see FIG. 8) provide the ability to take gap measurements 48 (see FIG. 4) of gaps 16 between mating parts 20, or adjoining parts, where it may be difficult to take a gap measurement 48 because of geometry.

In addition, disclosed versions of the gap measurement tool assembly 12 (see FIGS. 2A-2C), the gap measurement system 14 (see FIGS. 4, 5A-5B), and the method 180 (see FIG. 8) use an air gage system 32 (see FIGS. 4, 5A-5B), such as a non-contact air gage system 32a (see FIGS. 5A-5B), and air supply source 34 (see FIGS. 4, 5A-5B) with air 36 (see FIGS. 4, 5A-5B), such as compressed air 36a (see FIGS. 4, 5A-5B), to measure one of, back pressure 40 (see FIG. 4), air flow 42 (see FIG. 4), or differential pressure 44 (see FIG. 4), and correlate the measurement 38 (see FIG. 4) to a predetermined gap measurement 46 (see FIG. 4), to determine the gap size 28 (see FIG. 4), such as the gap width 30 (see FIG. 4) of the gap 16, such as the part interface gap 16a, at the through hole 18, such as the fastener through hole 18a, between the mating parts 20 of the structure 24.

When the gap measurement tool 10, or mandrel, is inserted into the through hole 18, the cross-hole 94 (see FIGS. 5A-5B) aligns, or lines up with, the gap 16 between the mating parts 20 and at the through hole 18 through the mating parts 20 or part stack-up. The gap measurement tool 10, or mandrel, comprises the hollow inner channel 76 (see FIGS. 5A-5B) with the third seal element 120 (see FIGS. 5A-5B), such as a plug seal 120a (see FIG. 4) at the second end 56 (see FIGS. 5A-5B), such as the distal end 56a, to seal the hollow inner channel 76. The gap measurement tool 10, or mandrel, further comprises the second seal element 116 (see FIGS. 5A-5B, such as the O-ring seal 116a (see FIG. 4), on the second exterior annular groove 102 (see FIG. 1E) near the second end 56, such as the distal end 56a, to secure the gap measurement tool 10, or mandrel, in the through hole 18, with the cross-hole 94 (see FIGS. 5A-5B), or circular opening, on either side of the gap measurement tool 10, or mandrel, that extends from the hollow inner channel 76 to the exterior 74a (see FIG. 1E) of the body 58 (see FIG. 1E) of the gap measurement tool 10, or mandrel, located at a position that is approximately 180 degrees apart on opposite sides of the gap measurement tool 10, or mandrel.

Air 36, such as compressed air 36a, is passed from the air supply source 34 and the air gage system 32, into and through the gap measurement tool 10, or mandrel, inserted into the through hole 18, and air leakage through the gap measurement tool 10, or mandrel, and through any gap 16, such as an interior gap, at the through hole 18 causes a corresponding change in the back pressure 40, the air flow 42, or the differential pressure 44, and is proportional to the gap size 28, such as the gap width 30, of the gap 16. The back pressure 40, the air flow 42, and/or the differential pressure 44 generated through the air gage 130 (see FIGS. 5A-5B) or differential pressure gauge 158 (see FIG. 6), is measured with the air gage system 32. Disclosed versions of the gap measurement tool assembly 12 (see FIGS. 2A-2C), the gap measurement system 14 (see FIGS. 4, 5A-5B), and the method 180 (see FIG. 8) use air pressure and a sensitive air gage 130 or differential pressure gauge 158 to measure the amount of air 36, such as compressed air 36a, that passes through the gap 16, such as the inner gap. In addition, the air gage system 32 and gap measurement tool assembly 12 have no moving parts, which provide for a long-lasting system. Further, the air gage system 32 is self-cleaning and the air gage 130 or differential pressure gauge 158 that is inserted into the gap measurement tool assembly 12 is resistant to dust and debris which is blown out with the air 36, such as the compressed air 36a.

In addition, known air gaging techniques typically measure a mean surface of a part or a diameter of a hole in a part, and no air gaging assembly, system, or method is believed to measure a gap at a through hole between mating parts.

Moreover, the gap measurement system 14 (see FIGS. 4, 5A-5B) may be calibrated or mastered using mating master blocks 21 (see FIGS. 3A-3E), such as a first set 21c (see FIG. 3D) and a second set 21d (see FIG. 3E), each with a first mating master block 21a (see FIG. 3A) and a second mating master block 21b (see FIG. 3B), having precisely machined gaps, to obtain a range 47 (see FIG. 4) of predetermined gap measurements 46 (see FIG. 4) with known gap sizes 28a (see FIGS. 3C-3D), such as known gap widths 30a (see FIGS. 3C-3D).

To calibrate the gap measurement system 14, the gap measurement tool assembly 12, and in particular, the gap measurement tool 10, or mandrel, may be inserted into the first set 21c of mating master blocks 21 having a maximum gap 16b (see FIG. 3D) with a known gap size 28a (see FIG. 3D), and inserted into the second set 21d of mating master blocks 21 having a minimum gap 16c (see FIG. 3E), such as no gap or a very small gap, and one of the back pressure 40, air flow 42, or differential pressure 44, is measured with the air gage system 32 coupled to the gap measurement tool assembly 12. Once the gap measurement system 14 is properly calibrated or mastered, an operator or use can quickly measure gaps 16 at through holes 18 through mating parts 20 in a structure 24, such as the aircraft structure 26.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A gap measurement tool assembly for measuring a gap at a through hole between mating parts of a structure, the gap measurement tool assembly comprising:
   a gap measurement tool comprising:
      a first end configured to couple to an air gage system and an air supply source;
      a second end configured to be inserted into the through hole; and
      a body formed between the first end and the second end, the body comprising:
         a hollow inner channel;
         an exterior annular crevice;
         a first exterior annular groove having a cross-hole intersected by the hollow inner channel; and
         a second exterior annular groove positioned distal to the first exterior annular groove;
   a first seal element fitted around the exterior annular crevice;
   a second seal element fitted around the second exterior annular groove; and
   a third seal element inserted into a portion of the hollow inner channel at the second end of the gap measurement tool,
   wherein the gap measurement tool assembly is configured for insertion and sealing into the through hole and through the mating parts, and the cross-hole is configured to align with the gap, such that when compressed air is passed into the gap, via the hollow inner channel, the air gage system takes a measurement of one of, a back pressure, an air flow, or a differential pressure, and correlates the measurement to a predetermined gap measurement, to determine a gap size of the gap at the through hole between the mating parts of the structure.

2. The gap measurement tool assembly of claim 1, wherein the gap measurement tool comprises a machined circular mandrel.

3. The gap measurement tool assembly of claim 1, wherein the body of the gap measurement tool comprises a head portion, and a shaft portion coupled to, and extending from, the head portion, and further wherein the exterior annular crevice is positioned between the head portion and the shaft portion.

4. The gap measurement tool assembly of claim 1, wherein the first exterior annular groove on the body of the gap measurement tool has an annular slot having a width that is greater than a gap width of the gap, and greater than a cross-hole diameter of the cross-hole.

5. The gap measurement tool assembly of claim 1, wherein the first seal element comprises one of, a flat elastomeric seal, or a flat gasket seal, and when the gap measurement tool assembly is inserted into the through hole through the mating parts, the first seal element seals a circumference of the through hole at an entry side of the through hole.

6. The gap measurement tool assembly of claim 1, wherein the second seal element comprises one of, an O-ring seal, or a gasket seal, and when the gap measurement tool assembly is inserted into the through hole through the mating parts, the second seal element seals a circumference of the through hole at, or near, an exit side of the through hole.

7. The gap measurement tool assembly of claim 1, wherein the third seal element comprises one of, a plug seal, or a set screw seal, and seals the second end of the gap measurement tool.

8. The gap measurement tool assembly of claim 1, wherein the gap measurement tool is made of a metal material comprising one or more of, stainless steel, steel, and aluminum.

9. The gap measurement tool assembly of claim 1, wherein the predetermined gap measurement is selected from a range of predetermined gap measurements obtained using mating master blocks with known gap sizes.

10. A gap measurement system for measuring a gap at a through hole between mating parts of a structure, the gap measurement system comprising:
   a gap measurement tool assembly configured for insertion into the through hole and for alignment with the gap between the mating parts, the gap measurement tool assembly comprising:
      a gap measurement tool comprising a first end, a second end, and a body formed between the first end and the second end, the body comprising:
         a hollow inner channel;
         an exterior annular crevice;
         a first exterior annular groove having a cross-hole intersected by the hollow inner channel; and
         a second exterior annular groove positioned distal to the first exterior annular groove;
      a first seal element fitted around the exterior annular crevice;
      a second seal element fitted around the second exterior annular groove; and
      a third seal element inserted into a portion of the hollow inner channel at the second end of the gap measurement tool;
   an air gage system coupled to the first end of the gap measurement tool; and
   an air supply source having compressed air, the air supply source coupled to the air gage system,
   wherein when the gap measurement tool assembly is inserted into the through hole and through the mating parts, so that the cross-hole is aligned with the gap, and an entry side and an exit side of the through hole are sealed, the compressed air is passed through the gap, via the hollow inner channel, and the air gage system takes a measurement of one of, a back pressure, an air flow, or a differential pressure, and correlates the measurement to a predetermined gap measurement, to determine a gap size of the gap at the through hole between the mating parts of the structure.

11. The gap measurement system of claim 10, wherein the gap measurement system is a portable gap measurement system configured to be independently carried, or transported, to the mating parts having the gap to be measured.

12. The gap measurement system of claim 10, wherein the gap measurement system is an automated gap measurement system comprising the gap measurement system mounted to a robot, the automated gap measurement system configured to automatically measure the gap at the through hole between the mating parts.

13. The gap measurement system of claim 10, wherein the mating parts comprise aircraft mating parts, the structure comprises an aircraft structure, and the through hole comprises a fastener through hole.

14. The gap measurement system of claim 10, wherein:
the first seal element comprises a flat elastomeric seal, to seal a circumference of the through hole at the entry side of the through hole;
the second seal element comprises an O-ring seal, to seal a circumference of the through hole at, or near, the exit side of the through hole; and
the third seal element comprises a plug seal, to seal the second end of the gap measurement tool.

15. The gap measurement system of claim 10, wherein, the predetermined gap measurement is selected from a range of predetermined gap measurements obtained using mating master blocks with known gap sizes.

16. A method for measuring a gap at a through hole between mating parts of a structure, the method comprising the steps of:
providing a gap measurement tool assembly comprising:
a gap measurement tool comprising a first end, a second end, and a body formed between the first end and the second end, the body comprising:
a hollow inner channel;
an exterior annular crevice;
a first exterior annular groove having a cross-hole intersected by the hollow inner channel; and
a second exterior annular groove positioned distal to the first exterior annular groove;
a first seal element fitted around the exterior annular crevice;
a second seal element fitted around the second exterior annular groove; and
a third seal element inserted into a portion of the hollow inner channel at the second end of the gap measurement tool;
coupling the gap measurement tool assembly to an air gage system and an air supply source having compressed air, to obtain a gap measurement system;
inserting the gap measurement tool assembly into the through hole and through the mating parts, so that the cross-hole of the gap measurement tool is aligned with the gap at the through hole between the mating parts, and an entry side and an exit side of the through hole are sealed;
passing the compressed air through the hollow inner channel of the gap measurement tool and into the gap;
using the air gage system to take a measurement of one of, a back pressure, an air flow, or a differential pressure; and
correlating the measurement to a predetermined gap measurement, to determine a gap size of the gap at the through hole between the mating parts of the structure.

17. The method of claim 16, further comprising, before the step of inserting the gap measurement tool assembly into the through hole and through the mating parts, the step of:
calibrating the gap measurement system using mating master blocks having known gap sizes, to obtain a range of predetermined gap measurements.

18. The method of claim 16, further comprising after the step of coupling the gap measurement tool assembly to the air gage system and the air supply source, to obtain the gap measurement system, the step of:
mounting the gap measurement system to a robot, to obtain an automated gap measurement system that automatically measures the gap at the through hole between the mating parts.

19. The method of claim 16, wherein the step of inserting the gap measurement tool assembly into the through hole and through the mating parts, further comprises:
sealing, with the first seal element, a circumference of the through hole at the entry side of the through hole;
sealing, with the second seal element, a circumference of the through hole at, or near, the exit side of the through hole; and
sealing, with the third seal element, the second end of the gap measurement tool.

20. The method of claim 16, wherein the step of inserting the gap measurement tool assembly into the through hole and through the mating parts, further comprises:
inserting the gap measurement tool assembly into the through hole comprising a fastener through hole, and through the mating parts comprising aircraft mating parts, of the structure comprising an aircraft structure.

* * * * *